United States Patent
Kumazaki et al.

(10) Patent No.: US 9,415,675 B2
(45) Date of Patent: Aug. 16, 2016

(54) HYBRID VEHICLE DRIVING DEVICE

(75) Inventors: Kenta Kumazaki, Toyota (JP); Tooru Matsubara, Toyota (JP); Atsushi Tabata, Okazaki (JP); Tatsuya Imamura, Okazaki (JP); Tsuyoshi Kitahata, Toyota (JP); Yasuhiro Hiasa, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/407,664

(22) PCT Filed: Jun. 14, 2012

(86) PCT No.: PCT/JP2012/065277
§ 371 (c)(1),
(2), (4) Date: Dec. 12, 2014

(87) PCT Pub. No.: WO2013/186905
PCT Pub. Date: Dec. 19, 2013

(65) Prior Publication Data
US 2015/0165891 A1    Jun. 18, 2015

(51) Int. Cl.
*B60K 6/445* (2007.10)
*B60K 6/442* (2007.10)
*B60W 10/08* (2006.01)
(Continued)

(52) U.S. Cl.
CPC ............ *B60K 6/442* (2013.01); *B60K 6/365* (2013.01); *B60K 6/383* (2013.01); *B60K 6/445* (2013.01); *B60K 6/50* (2013.01); *B60K 6/547* (2013.01); *B60W 10/08* (2013.01); *B60W 10/10* (2013.01); *B60W 20/00* (2013.01); *B60W 20/30* (2013.01); *B60W 30/19* (2013.01); *B60K 2006/381* (2013.01); *F16H 2037/102* (2013.01); *Y02T 10/6239* (2013.01); *Y10S 903/911* (2013.01)

(58) Field of Classification Search
None
See application file for complete search history.

(56) References Cited

U.S. PATENT DOCUMENTS

| 2004/0082419 A1* | 4/2004 | Randall | B60K 6/40 475/149 |
| 2004/0112317 A1* | 6/2004 | Tumback | B60K 6/547 123/179.3 |

(Continued)

FOREIGN PATENT DOCUMENTS

| JP | 2005-145100 | 6/2005 |
| JP | 2009-190694 | 8/2009 |
| JP | 2010-274855 | 12/2010 |

*Primary Examiner* — Justin Holmes
(74) *Attorney, Agent, or Firm* — Finnegan, Henderson, Farabow, Garrett & Dunner, LLP

(57) ABSTRACT

Provided is a hybrid vehicle driving device including: a first differential mechanism configured to be connected to an engine and transmit a rotation of the engine; a second differential mechanism configured to connect the first differential mechanism and a driving wheel; and a switching device configured to shift the first differential mechanism, wherein the second differential mechanism includes a first rotation component connected to an output component of the first differential mechanism, a second rotation component connected to the first rotation machine, and a third rotation component connected to the second rotation machine and the driving wheel, and a reaction torque of the first rotation machine is corrected at a torque phase (S2-Y) after a start of the gear shift operation of the first differential mechanism by the switching device while the vehicle travels by using the engine as a power source (S3).

6 Claims, 17 Drawing Sheets

(51) Int. Cl.
  *B60W 20/00* (2016.01)
  *B60K 6/383* (2007.10)
  B60W 30/19 (2012.01)
  *B60K 6/547* (2007.10)
  *B60W 10/10* (2012.01)
  *B60K 6/365* (2007.10)
  *B60K 6/50* (2007.10)
  *B60K 6/38* (2007.10)
  *F16H 37/10* (2006.01)

(56) References Cited

U.S. PATENT DOCUMENTS

| 2005/0103544 | A1* | 5/2005 | Takami | B60K 6/365 180/65.235 |
| 2006/0142117 | A1* | 6/2006 | Colvin | B60K 6/365 477/107 |
| 2010/0210388 | A1* | 8/2010 | Grochowski | B60K 6/365 475/5 |

\* cited by examiner

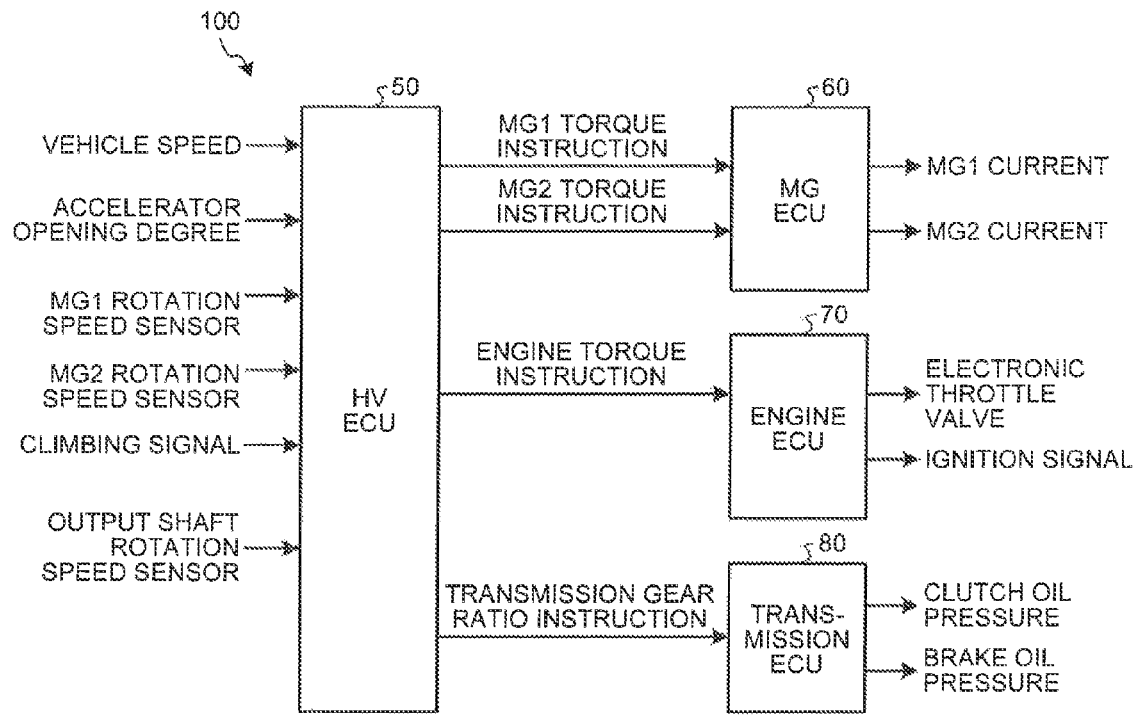

HYBRID VEHICLE DRIVING DEVICE

FIELD

The present invention relates to a hybrid vehicle driving device.

BACKGROUND

Hitherto, there is known a hybrid vehicle including a transmission that transmits a rotation of an engine while changing the rotation speed thereof. For example, Patent Literature 1 discloses a technique of a hybrid vehicle driving device including a transmission mechanism which transmits a rotation of an internal combustion engine to a power dividing mechanism while changing the rotation speed thereof, a first transmission shaft which transmits power from the internal combustion engine to the transmission mechanism, and a second transmission shaft which transmits power output from the transmission mechanism to the power dividing mechanism.

CITATION LIST

Patent Literature

Patent Literature 1: Japanese Patent Application Laid-open No. 2009-190694

SUMMARY

Technical Problem

In the hybrid vehicle including the transmission that transmits the rotation of the engine while changing the rotation speed thereof, the gear shift control in the gear shift operation was not sufficiently examined in the related art. For example, there is the possibility of improvement in the technique of suppressing a fluctuation in the rotation speed of the engine or the shift shock caused by a fluctuation in output torque during the gear shift operation.

An object of the present invention is to provide a hybrid vehicle driving device capable of suppressing a fluctuation in output torque during a gear shift operation. Another object of the present invention is to provide a hybrid vehicle driving device capable of suppressing a fluctuation in the rotation speed of an engine during a gear shift operation.

Solution to Problem

A hybrid vehicle driving device according to the invention includes a first differential mechanism configured to be connected to an engine and transmit a rotation of the engine; a second differential mechanism configured to connect the first differential mechanism and a driving wheel; and a switching device configured to shift the first differential mechanism, wherein the second differential mechanism includes a first rotation component connected to an output component of the first differential mechanism, a second rotation component connected to the first rotation machine, and a third rotation component connected to the second rotation machine and the driving wheel, and a reaction torque of the first rotation machine is corrected at a torque phase after a start of the gear shift operation of the first differential mechanism by the switching device while the vehicle travels by using the engine as a power source.

In the hybrid vehicle driving device, it is preferable that at the time the first differential mechanism is shifted by the switching device, an output torque of the engine is constant or a change rate of the output torque is smaller than a predetermined value.

In the hybrid vehicle driving device, it is preferable that the reaction torque is corrected so as to suppress undershoot of the rotation speed of the first rotation machine at the torque phase.

In the hybrid vehicle driving device, it is preferable that the gear shift operation is an up-shift operation, and the reaction torque is decreased by the correction of the reaction torque.

In the hybrid vehicle driving device, it is preferable that the gear shift operation is a down-shift operation, and the reaction torque is increased by the correction of the reaction torque.

Advantageous Effects of Invention

The hybrid vehicle driving device according to the invention corrects a reaction torque of a first rotation machine at a torque phase after a gear shift operation of a first differential mechanism is started by a switching device during the vehicle travels by using an engine as a power source. The hybrid vehicle driving device according to the invention has an effect that a fluctuation in output torque during a gear shift operation is suppressed.

BRIEF DESCRIPTION OF DRAWINGS

FIG. 2 is a diagram illustrating an input/output relation of the vehicle according to the first embodiment.

FIG. 3 is a diagram illustrating an operation engagement table of a hybrid vehicle driving device according to the first embodiment.

DESCRIPTION OF EMBODIMENTS

Hereinafter, a hybrid vehicle driving device according to an embodiment of the invention will be described in detail with reference to the drawings. Furthermore, the invention is not limited to the embodiments. Further, components in the following embodiments include a component which may be easily supposed by the person skilled in the art or substantially the same component.

First Embodiment

Figure 1:
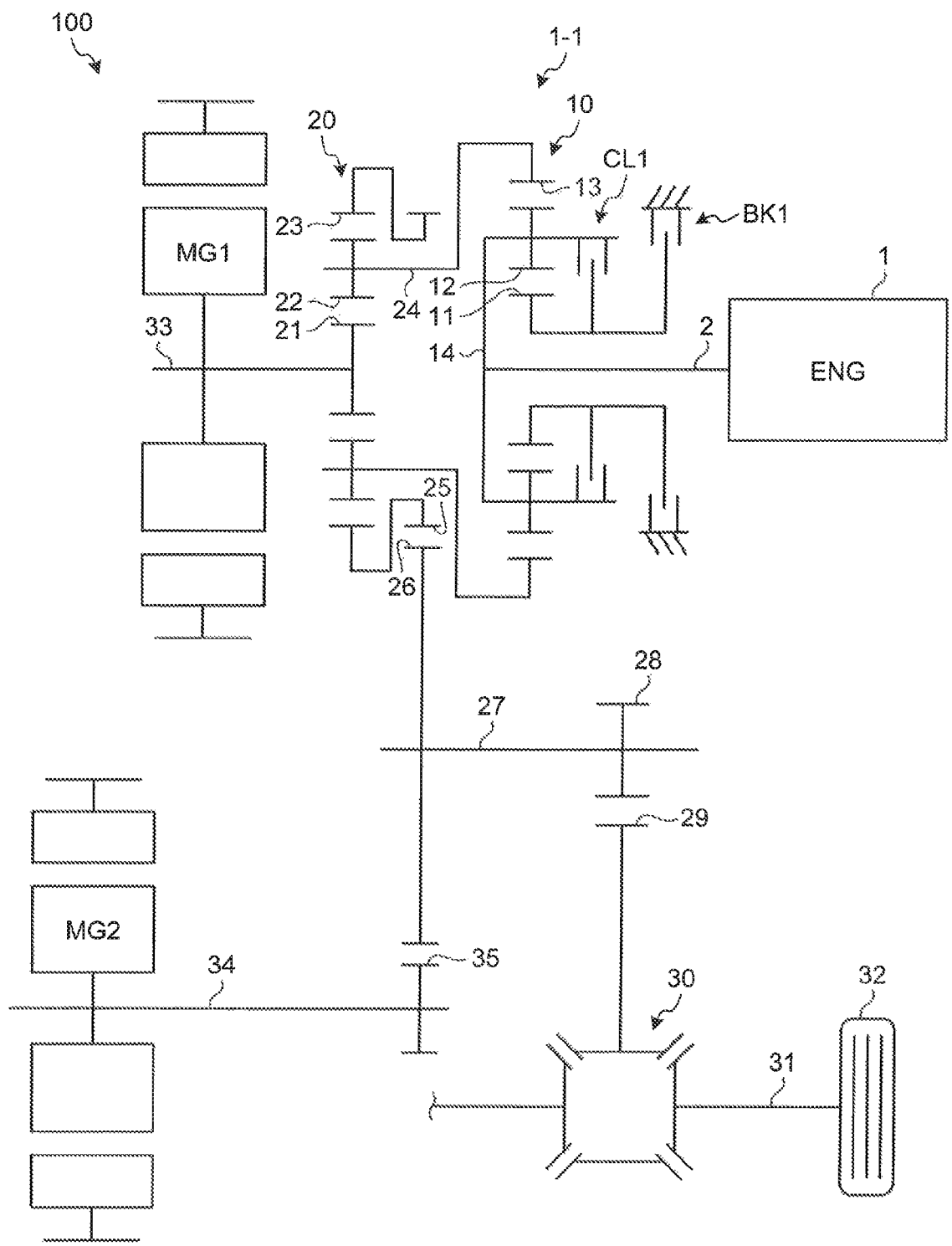
FIG. 1 is a skeleton diagram of a vehicle according to a first embodiment.

A first embodiment will be described with reference to FIGS. 1 to 16. The embodiment relates to a hybrid vehicle driving device. FIG. 1 is a skeleton diagram of a vehicle according to the first embodiment of the invention, and FIG. 2 is a diagram illustrating an input/output relation of the vehicle according to the first embodiment.

A vehicle 100 according to the embodiment is a hybrid vehicle that includes an engine 1, a first rotation machine MG1, and a second rotation machine MG2 as power sources. The vehicle 100 may be a plug-in hybrid vehicle which may be charged by an external power supply. As illustrated in FIGS. 1 and 2, the vehicle 100 is configured to include the engine 1, a first planetary gear mechanism 10, a second planetary gear mechanism 20, the first rotation machine MG1, the second rotation machine MG2, a clutch CL1, a brake BK1, an HV_ECU 50, an MG_ECU 60, an engine_ECU 70, and a transmission ECU 80.

Further, a hybrid vehicle driving device 1-1 according to the embodiment is configured to include the first planetary gear mechanism 10, the second planetary gear mechanism 20, the clutch CL1, and the brake BK1. The hybrid vehicle driving device 1-1 may be configured to further include control devices such as the ECUs 50, 60, 70, and 80. The hybrid vehicle driving device 1-1 may be applied to an FF (front engine/front drive) vehicle or a RR (rear engine/rear drive) vehicle. The hybrid vehicle driving device 1-1 is mounted on the vehicle 100 so that the axial direction becomes the vehicle width direction, for example.

In the hybrid vehicle driving device 1-1 according to the embodiment, a transmission unit is configured to include the first planetary gear mechanism 10, the clutch CL1, and the brake BK1. Further, a differential unit is configured to include the second planetary gear mechanism 20. Further, a switching device which shifts the first planetary gear mechanism 10 is configured to include the clutch CL1 and the brake BK1.

The engine 1 converts the combustion energy of fuel into the rotation of the output shaft, and outputs the rotation. The output shaft of the engine 1 is connected to an input shaft 2. The input shaft 2 is an input shaft of a power transmission device. The power transmission device is configured to include the first rotation machine MG1, the second rotation machine MG2, the clutch CL1, the brake BK1, a differential device 30, and the like. The input shaft 2 is disposed so as to be coaxial with the output shaft of the engine 1 and is disposed on the extension line of the output shaft. The input shaft 2 is connected to a first carrier 14 of the first planetary gear mechanism 10.

The first planetary gear mechanism 10 of the embodiment corresponds to a first differential mechanism which is connected to the engine 1 and transmits the rotation of the engine 1. The first planetary gear mechanism 10 is an input side differential mechanism which is disposed near the engine 1 in relation to the second planetary gear mechanism 20. The first planetary gear mechanism 10 may output the rotation of the engine 1 while changing the rotation speed thereof. The first planetary gear mechanism 10 is of a single pinion type, and includes a first sun gear 11, a first pinion gear 12, a first ring gear 13, and the first carrier 14.

The first ring gear 13 is disposed so as to be coaxial with the first sun gear 11 and is disposed at the outside of the first sun gear 11 in the radial direction. The first pinion gear 12 is disposed between the first sun gear 11 and the first ring gear 13, and engages with the first sun gear 11 and the first ring gear 13. The first pinion gear 12 is rotatably supported by the first carrier 14. The first carrier 14 is connected to the input shaft 2, and rotates along with the input shaft 2. Accordingly, the first pinion gear 12 may rotate (revolve) about the center axis of the input shaft 2 along with the input shaft 2 and may rotate (spin) about the center axis of the first pinion gear 12 while being supported by the first carrier 14.

The clutch CL1 is a clutch device which can connect the first sun gear 11 and the first carrier 14. The clutch CL1 may be, for example, a friction engagement type clutch, but the invention is not limited thereto. For example, a clutch device such as a meshing type clutch may be used as the clutch CL1. The clutch CL1 is driven by, for example, a hydraulic pressure so as to be engaged or released. The clutch CL1 in the full engagement state may connect the first sun gear 11 and the first carrier 14 so that the first sun gear 11 and the first carrier 14 rotate together. The clutch CL1 in the full engagement state regulates the differential operation of the first planetary gear mechanism 10. Meanwhile, the clutch CL1 in the released state separates the first sun gear 11 and the first carrier 14 so that the relative rotation between the first sun gear 11 and the first carrier 14 is allowed. That is, the clutch CL1 in the released state allows the differential operation of the first planetary gear mechanism 10. Furthermore, the clutch CL1 may be controlled in a half engagement state.

The brake BK1 is a brake device which can regulate the rotation of the first sun gear 11. The brake BK1 includes an engagement component which is connected to the first sun gear 11 and an engagement component which is connected to a vehicle body, for example, the casing of the power transmission device. The brake BK1 may be configured as the friction engagement type clutch device similar to the clutch CL1, but the invention is not limited thereto. For example, a clutch device such as a meshing type clutch may be used as the brake BK1. The brake BK1 is driven by, for example, a hydraulic pressure so as to be engaged or released. The brake BK1 in the full engagement state may connect the first sun gear 11 to the vehicle body so that the rotation of the first sun gear 11 is regulated. Meanwhile, the brake BK1 in the released state separates the first sun gear 11 from the vehicle body so that the rotation of the first sun gear 11 is allowed. Furthermore, the brake BK1 may be controlled in the half engagement state.

The second planetary gear mechanism 20 of the embodiment corresponds to a second differential mechanism which connects the first planetary gear mechanism 10 and a driving wheel 32. The second planetary gear mechanism 20 is an output side differential mechanism which is disposed at the side of the driving wheel 32 in relation to the first planetary gear mechanism 10. The second planetary gear mechanism 20 is of a single pinion type, and includes a second sun gear 21, a second pinion gear 22, a second ring gear 23, and a second carrier 24. The second planetary gear mechanism 20 is disposed so as to be coaxial with the first planetary gear mechanism 10 and is disposed so as to face the engine 1 with the first planetary gear mechanism 10 interposed therebetween.

The second ring gear 23 is disposed so as to be coaxial with the second sun gear 21 and is disposed at the outside of the second sun gear 21 in the radial direction. The second pinion gear 22 is disposed between the second sun gear 21 and the second ring gear 23, and engages with the second sun gear 21 and the second ring gear 23. The second pinion gear 22 is rotatably supported by the second carrier 24. The second carrier 24 is connected to the first ring gear 13, and rotates along with the first ring gear 13. The second pinion gear 22 may rotate (revolve) about the center axis of the input shaft 2 along with the second carrier 24 and may rotate (spin) about the center axis of the second pinion gear 22 while being supported by the second carrier 24. The first ring gear 13 is an output component of the first planetary gear mechanism 10, and may output the rotation which is input from the engine 1 to the first planetary gear mechanism 10, to the second carrier 24. The second carrier 24 corresponds to a first rotation component connected to the output component of the first planetary gear mechanism 10.

A rotation shaft 33 of the first rotation machine MG1 is connected to the second sun gear 21. The rotation shaft 33 of the first rotation machine MG1 is disposed so as to be coaxial with the input shaft 2 and rotates along with the second sun gear 21. The second sun gear 21 corresponds to a second rotation component connected to the first rotation machine MG1. A counter drive gear 25 is connected to the second ring gear 23. The counter drive gear 25 is an output gear which rotates along with the second ring gear 23. The second ring gear 23 corresponds to a third rotation component which is connected to the second rotation machine MG2 and the driving wheel 32. The second ring gear 23 is an output component which may output the rotation input from the first rotation machine MG1 or the first planetary gear mechanism 10 to the driving wheel 32.

The counter drive gear 25 engages with a counter driven gear 26. The counter driven gear 26 is connected to a drive pinion gear 28 through a counter shaft 27. The counter driven gear 26 and the drive pinion gear 28 rotate together. Further, a reduction gear 35 engages with the counter driven gear 26. The reduction gear 35 is connected to a rotation shaft 34 of the second rotation machine MG2. That is, the rotation of the second rotation machine MG2 is transmitted to the counter driven gear 26 through the reduction gear 35. The reduction gear 35 has a diameter smaller than that of the counter driven gear 26, and transmits the rotation of the second rotation machine MG2 to the counter driven gear 26 while the rotation speed is decreased.

The drive pinion gear 28 engages with a differential ring gear 29 of the differential device 30. The differential device 30 is connected to driving wheels 32 through left and right drive shafts 31. The second ring gear 23 is connected to the driving wheel 32 through the counter drive gear 25, the counter driven gear 26, the drive pinion gear 28, the differential device 30, and the drive shaft 31. Further, the second rotation machine MG2 is connected to the power transmission line between the second ring gear 23 and the driving wheel 32, and may transmit power to the second ring gear 23 and the driving wheel 32.

Each of the first rotation machine MG1 and the second rotation machine MG2 has a function of a motor (an electric rotating machine) and a function of a generator. The first rotation machine MG1 and the second rotation machine MG2 are connected to a battery through an inverter. The first rotation machine MG1 and the second rotation machine MG2 may output the mechanical power while the electric power supplied from the battery is converted into mechanical power and may convert the mechanical power into electric power while being driven by the power input thereto. The electric power which is generated by the rotation machines MG1 and MG2 may be stored in the battery. As the first rotation machine MG1 and the second rotation machine MG2, for example, an AC synchronization type motor generator may be used.

In the vehicle 100 of the embodiment, the brake BK1, the clutch CL1, the first planetary gear mechanism 10, the counter drive gear 25, the second planetary gear mechanism 20, and the first rotation machine MG1 are disposed in this order from the engine 1 so as to be coaxial with the engine 1. Further, the hybrid vehicle driving device 1-1 of the embodiment is of a multi-axial type in which the input shaft 2 and the rotation shaft 34 of the second rotation machine MG2 are disposed on different axes.

As illustrated in FIG. 2, the vehicle 100 includes the HV_ECU 50, the MG_ECU 60, the engine_ECU 70, and the transmission ECU 80. Each of the ECUs 50, 60, 70, and 80 is an electronic control unit including a computer. The HV_ECU 50 has a function of controlling the entire vehicle 100. The MG_ECU 60, the engine_ECU 70, and the transmission ECU 80 are electrically connected to the HV_ECU 50.

The MG_ECU 60 may control the first rotation machine MG1 and the second rotation machine MG2. For example, the MG_ECU 60 may control the output torque of the first rotation machine MG1 by adjusting the current supplied to the first rotation machine MG1 or the generation amount of the first rotation machine MG1 and may control the output torque of the second rotation machine MG2 by adjusting the current supplied to the second rotation machine MG2 or the generation amount of the second rotation machine MG2.

The engine_ECU 70 may control the engine 1. For example, the engine_ECU 70 may control the opening degree of an electronic throttle valve of the engine 1, may control the ignition of the engine by outputting an ignition signal, and may control the injection of the fuel to the engine 1. The engine_ECU 70 may control the output torque of the engine 1 by the control of the opening degree of the electronic throttle valve, the control of the injection, and the control of the ignition.

The transmission ECU 80 may control the transmission unit. The transmission ECU 80 controls the transmission unit by controlling the clutch oil pressure supplied to the clutch CL1 and the brake oil pressure supplied to the brake BK1. The transmission ECU 80 shifts the first planetary gear mechanism 10 by engaging or releasing the clutch CL1 and the brake BK1 based on the shift ratio instruction output from the HV_ECU 50.

A vehicle speed sensor, an accelerator opening degree sensor, an MG1 rotation speed sensor, an MG2 rotation speed sensor, an output shaft rotation speed sensor, and the like are connected to the HV_ECU 50. By the signals input from these sensors, the HV_ECU 50 may acquire the vehicle speed, the accelerator opening degree, the rotation speed of the first rotation machine MG1 (hereinafter, simply referred to as the "MG1 rotation speed"), the rotation speed of the second rotation machine MG2 (hereinafter, simply referred to as the "MG2 rotation speed"), the rotation speed of the output shaft of the power transmission device, and the like. A climbing signal and a signal indicating a battery state SOC are input to the HV_ECU 50 other than these signals.

The HV_ECU 50 may calculate the required driving force, the required power, the required torque, and the like for the vehicle 100 based on the acquired information. The HV_ECU 50 determines the output torque of the first rotation machine MG1 (hereinafter, referred to as the "MG1 torque"), the output torque of the second rotation machine MG2 (hereinafter, referred to as the "the MG2 torque"), and the output torque of the engine 1 (hereinafter, referred to as the "engine torque") based on the calculated required values. The HV_ECU 50 outputs the MG1 torque instruction value and the MG2 torque instruction value to the MG_ECU 60. Further, the HV_ECU 50 outputs the engine torque instruction value to the engine_ECU 70.

The HV_ECU 50 controls each of the clutch CL1 and the brake BK1 through the transmission ECU 80 based on the travel mode and the like to be described later. The HV_ECU 50 outputs the instruction value of the oil pressure (the engagement oil pressure) supplied to the clutch CL1 and the oil pressure (the engagement oil pressure) supplied to the brake BK1. The hydraulic control device (not illustrated) controls the oil pressures supplied to the clutch CL1 and the brake BK1 in response to the instruction values.

FIG. 3 is a diagram illustrating an operation engagement table of the hybrid vehicle driving device 1-1 according to the embodiment. The vehicle 100 may selectively perform the hybrid (HV) travel mode or the EV travel mode. The HV travel mode indicates a travel mode which causes the vehicle 100 to travel by using the engine 1 as the power source. In the HV travel mode, the second rotation machine MG2 may be used as the power source in addition to the engine 1.

The EV travel mode is a travel mode which causes the vehicle to travel by using at least one of the first rotation machine MG1 and the second rotation machine MG2 as the power source. In the EV travel mode, the vehicle may travel while the engine 1 is stopped. As the EV travel mode, the hybrid vehicle driving device 1-1 according to the embodiment includes a single motor EV mode which causes the vehicle 100 to travel by using the second rotation machine MG2 as a single power source and a dual motor EV mode which causes the vehicle 100 to travel by using the first rotation machine MG1 and the second rotation machine MG2 as the power sources.

Figure 4:
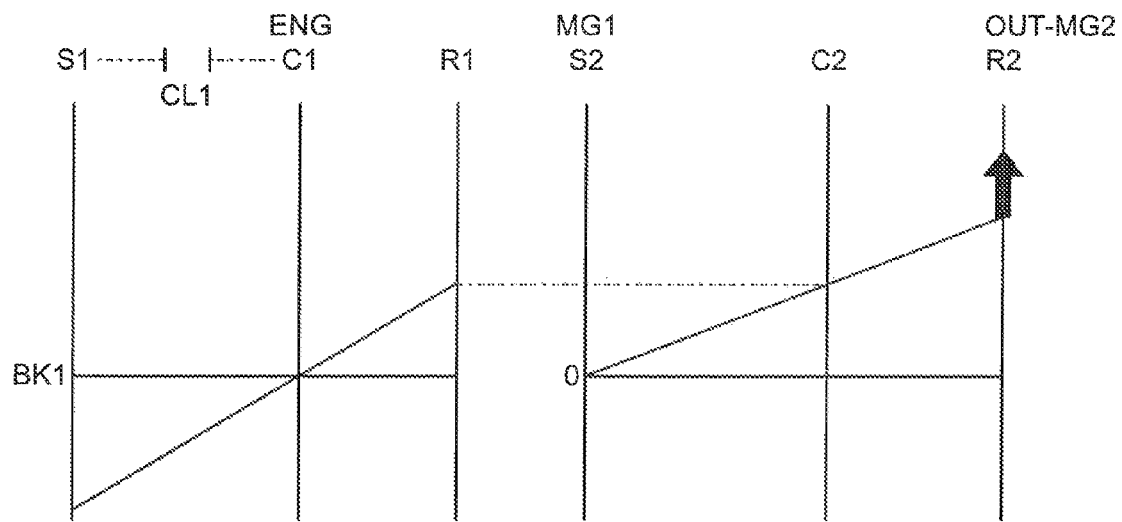
FIG. 4 is an alignment chart according to a single motor EV mode.

In the engagement table of FIG. 3, the circle of the sections of the clutch CL1 and the brake BK1 indicates the engagement state, and the blank indicates the released state. Further, the triangle indicates a state where any one of the clutch CL1 and the brake BK1 is engaged and the other thereof is released. The single motor EV mode is performed while, for example, both the clutch CL1 and the brake BK1 are released. FIG. 4 is an alignment chart according to the single motor EV mode. In the alignment chart, Reference Signs S1, C1, R1 respectively indicate the first sun gear 11, the first carrier 14, and the first ring gear 13, and Reference Signs S2, C2, and R2 respectively indicate the second sun gear 21, the second carrier 24, and the second ring gear 23.

In the single motor EV mode, the clutch CL1 and the brake BK1 are released. Since the brake BK1 is released, the rotation of the first sun gear 11 is allowed. Since the clutch CL1 is released, the differential operation of the first planetary gear mechanism 10 is allowed. The HV_ECU 50 makes the MG_ECU 60 generating a driving force in the vehicle 100 in the forward moving direction by causing the second rotation machine MG2 to output a positive torque. The second ring gear 23 rotates normally along with the rotation of the driving wheel 32. Here, the normal rotation is set as the rotation direction of the second ring gear 23 when the vehicle 100 moves forward. The HV_ECU 50 reduces the dragging loss by operating the first rotation machine MG1 as a generator. Specifically, the HV_ECU 50 generates power by applying a slight torque to the first rotation machine MG1, and sets the rotation speed of the first rotation machine MG1 to zero. Thus, the dragging loss of the first rotation machine MG1 may be reduced. Further, when the MG1 rotation speed can be maintained at zero by using a cogging torque even when the MG1 torque is zero, the MG1 torque may not be applied. Alternatively, the MG1 rotation speed may be set to zero by the d-axis locking of the first rotation machine MG1.

The first ring gear 13 rotates normally along with the second carrier 24. Since the first planetary gear mechanism 10 is in the neutral state where the clutch CL1 and the brake BK1 are released, the engine 1 is not rotated, and the rotation of the first carrier 14 stops. Accordingly, a large regeneration amount may be obtained. The first sun gear 11 rotates reversely in the idling state. Furthermore, the neutral state of the first planetary gear mechanism 10 is a state where no power is transmitted between the first ring gear 13 and the first carrier 14, that is, the engine 1 and the second planetary gear mechanism 20 are separated from each other so that the transmission of the power is interrupted. When at least one of the transmission clutch CL1 and the transmission brake BK1 engages, a connection state of the first planetary gear mechanism 10 is realized in which the engine 1 is connected to the second planetary gear mechanism 20.

There may be a case where the regeneration energy is not obtained due to the full charge state of the battery when the vehicle travels in the single motor EV mode. In this case, it is considered that an engine brake is used together. When the engine 1 is connected to the driving wheel 32 by the engagement of the clutch CL1 or the brake BK1, the engine brake may be applied to the driving wheel 32. As indicated by the triangle of FIG. 3, when the clutch CL1 or the brake BK1 is engaged in the single motor EV mode, the engine 1 is rotated, and the engine rotation speed is increased by the first rotation machine MG1 so that the engine brake state is realized.

Figure 5:
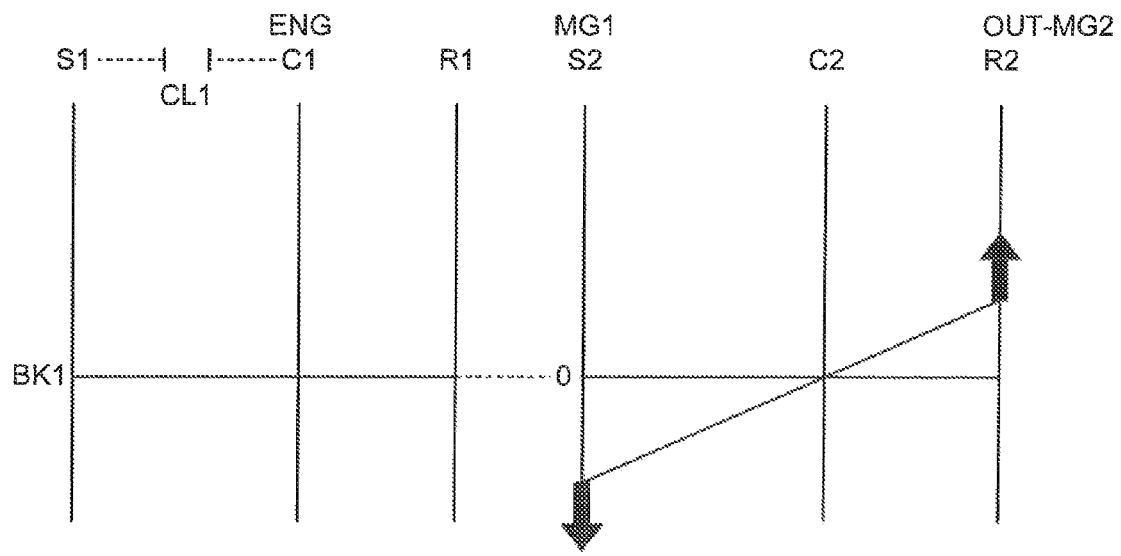
FIG. 5 is an alignment chart according to a dual motor EV mode.

In the dual motor EV mode, the HV_ECU 50 engages the clutch CL1 and the brake BK1. FIG. 5 is an alignment chart according to the dual motor EV mode. Since the clutch CL1 is engaged, the differential operation of the first planetary gear mechanism 10 is regulated. Since the brake BK1 is engaged, the rotation of the first sun gear 11 is regulated. Accordingly, the rotation of all rotation components of the first planetary gear mechanism 10 is stopped. Since the rotation of the first ring gear 13 as the output component is regulated, the rotation speed of the second carrier 24 connected thereto is locked to zero.

The HV_ECU 50 causes each of the first rotation machine MG1 and the second rotation machine MG2 to output a travel driving torque. Since the rotation of the second carrier 24 is regulated, a reaction force is obtained with respect to the torque of the first rotation machine MG1, and hence the torque of the first rotation machine MG1 may be output from the second ring gear 23. The first rotation machine MG1 may output a positive torque from the second ring gear 23 by rotating reversely and outputting a negative torque in the forward travelling. Meanwhile, the first rotation machine MG1 may output a negative torque from the second ring gear 23 by rotating normally and outputting a positive torque in the backward travelling.

Figure 6:
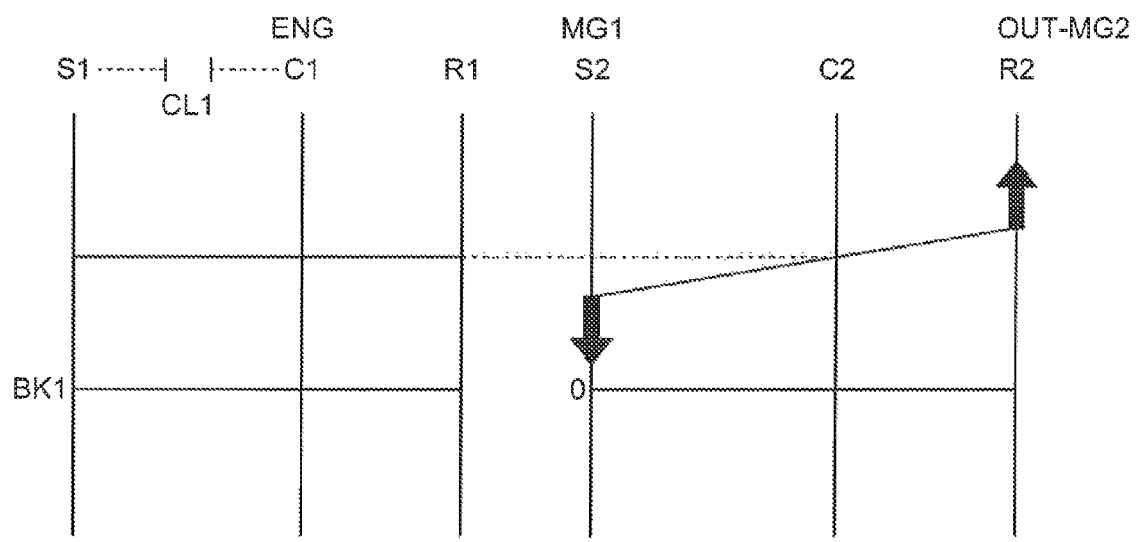
FIG. 6 is an alignment chart according to an HV low mode.
Figure 7:
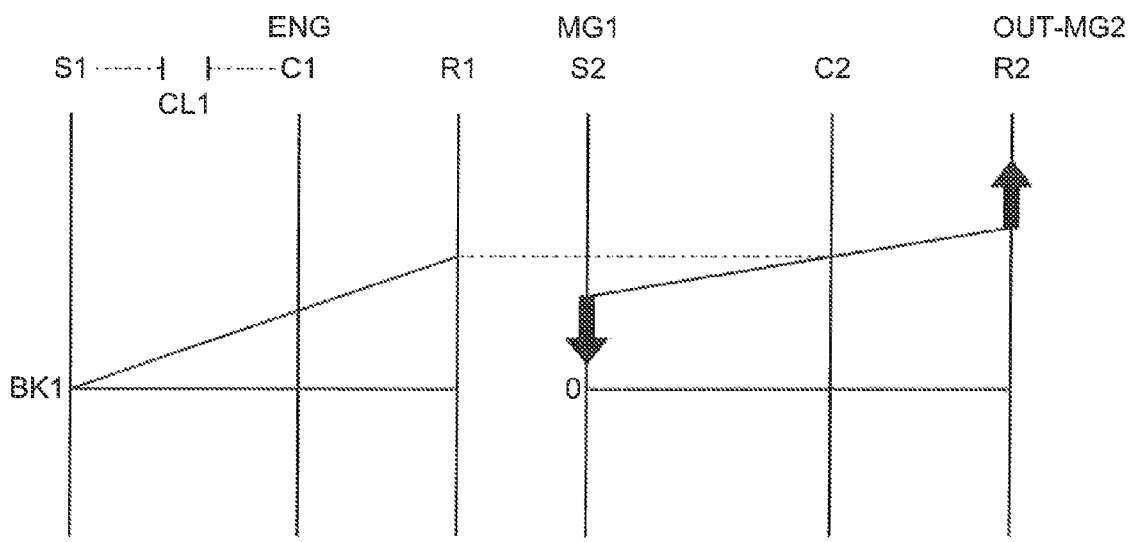
FIG. 7 is an alignment chart according to an HV high mode.

In the HV travel mode, the second planetary gear mechanism 20 as the differential unit is normally in a differential state and the first planetary gear mechanism 10 of the transmission unit is switched to the low/high state. FIG. 6 is an alignment chart according to the HV travel mode in the low state (hereinafter, referred to as the "HV low mode"), and FIG. 7 is an alignment chart according to the HV travel mode in the high state (hereinafter, referred to as the "HV high mode").

In the HV low mode, the HV_ECU 50 engages the clutch CL1 and releases the brake BK1. Since the clutch CL1 is engaged, the differential operation of the first planetary gear mechanism 10 is regulated, so that the rotation components 11, 13, and 14 rotate together. Accordingly, the rotation of the engine 1 is transmitted from the first ring gear 13 to the second carrier 24 at an equal rotation speed without being increased or decreased.

Meanwhile, in the HV high mode, the HV_ECU 50 releases the clutch CL1 and engages the brake BK1. Since the brake BK1 is engaged, the rotation of the first sun gear 11 is regulated. Accordingly, the first planetary gear mechanism 10 becomes an overdrive (OD) state where the rotation of the engine 1 input to the first carrier 14 is increased in speed and is output from the first ring gear 13. In this way, the first planetary gear mechanism 10 may output the rotation of the engine 1 while increasing the rotation speed thereof. The transmission gear ratio of the first planetary gear mechanism 10 in the overdrive state may be set to, for example, 0.7.

In this way, the switching device including the clutch CL1 and the brake BK1 shifts the first planetary gear mechanism 10 by switching a state where the differential operation of the first planetary gear mechanism 10 is regulated and a state where the differential operation of the first planetary gear mechanism 10 is allowed.

Figure 8:
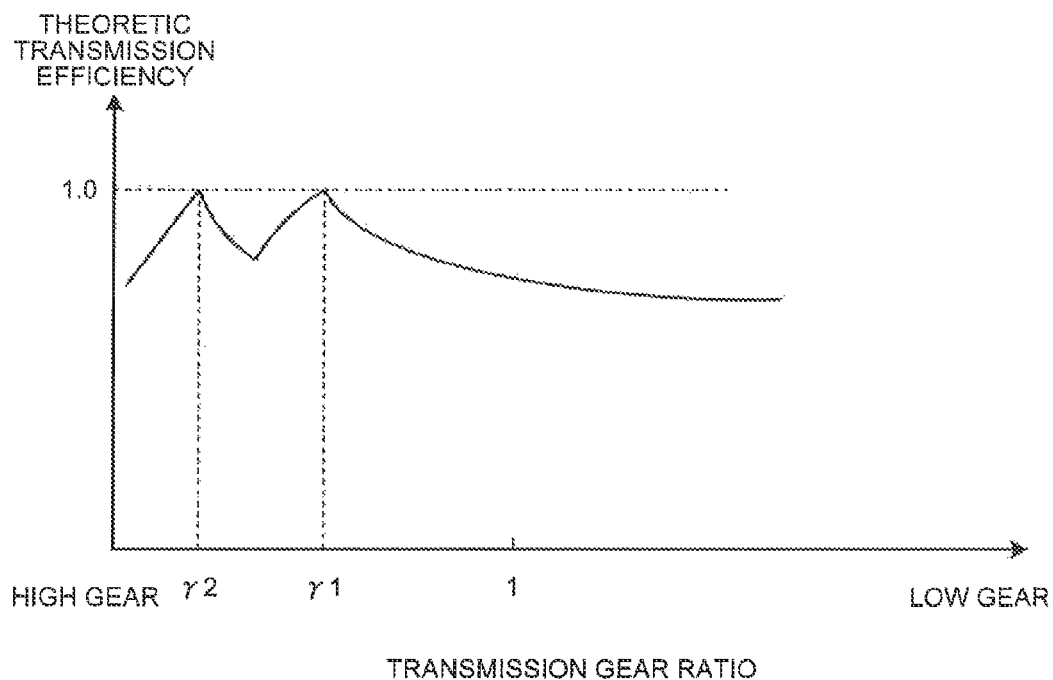
FIG. 8 is a diagram illustrating a theoretic transmission efficiency line according to the first embodiment.

For example, the HV_ECU 50 selects the HV high mode at the high vehicle speed and selects the HV low mode at the middle and low vehicle speeds. In the embodiment, since the rotation of the engine 1 is output while the rotation speed thereof is changed by switching the HV high mode and the HV low mode, two mechanical points exist as described later, and hence the fuel efficiency may be improved. FIG. 8 is a diagram illustrating a theoretic transmission efficiency line according to the embodiment.

In FIG. 8, the horizontal axis indicates the transmission gear ratio, and the vertical axis indicates the theoretic transmission efficiency. Here, the transmission gear ratio indicates the ratio (the deceleration ratio) of the input side rotation speed with respect to the output side rotation speed of the planetary gear mechanisms 10 and 20. For example, the transmission gear ratio indicates the ratio of the rotation speed of the first carrier 14 with respect to the rotation speed of the second ring gear 23. In the horizontal axis, the left side indicates a high gear side having a small transmission gear ratio, and the right side indicates a low gear side having a large transmission gear ratio. The theoretic transmission efficiency becomes the maximum efficiency 1.0 when the power input to the planetary gear mechanisms 10 and 20 is entirely transmitted to the counter drive gear 25 through the mechanical transmission without through the electric path.

The curve of FIG. 8 indicates the theoretic transmission efficiency line in the HV travel mode when the HV high mode and the HV low mode are appropriately switched. For example, relatively high efficient mode is selected from the HV high mode and the HV low mode at the same transmission gear ratio. Relatively right side indicates the theoretic transmission efficiency line in the HV low mode, and relatively left side indicates the theoretic transmission efficiency line in the HV high mode. The transmission efficiency of the HV low mode becomes maximal at the transmission gear ratio γ1. At the transmission gear ratio γ1, the rotation speed of the first rotation machine MG1 (the second sun gear 21) becomes 0. For this reason, the electric path caused by the reaction force with respect to the first rotation machine MG1 is zero at the transmission gear ratio γ1, and power may be transmitted from the engine 1 to the counter drive gear 25 only by the mechanical power transmission. The transmission gear ratio γ1 is an overdrive side transmission gear ratio, that is, a transmission gear ratio smaller than 1. In the specification, the transmission gear ratio γ1 is referred to as the "first mechanical transmission gear ratio γ1".

The theoretic transmission efficiency of the HV high mode becomes maximal at the transmission gear ratio γ2. In the HV high mode, the rotation speed of the first rotation machine MG1 (the second sun gear 21) becomes zero at the transmission gear ratio γ2, and power may be transmitted from the engine 1 to the counter drive gear 25 only by the mechanical power transmission. The transmission gear ratio γ2 is a high gear side transmission gear ratio in relation to the first mechanical transmission gear ratio γ1. In the specification, the transmission gear ratio γ2 is referred to as the "second mechanical transmission gear ratio γ2".

The theoretic transmission efficiency in the HV travel mode decreases as the transmission gear ratio becomes much lower than the first mechanical transmission gear ratio γ1. Further, the theoretic transmission efficiency in the HV travel mode decreases as the transmission gear ratio becomes much higher than the second mechanical transmission gear ratio γ2. The theoretic transmission efficiency of the HV travel mode is curved to the low efficiency side in the area of the transmission gear ratio between the first mechanical transmission gear ratio γ1 and the second mechanical transmission gear ratio γ2.

In this way, the hybrid vehicle driving device 1-1 according to the embodiment includes two mechanical points at the high gear side in relation to the transmission gear ratio 1. Since the hybrid vehicle driving device 1-1 includes the transmission unit having the first planetary gear mechanism 10, the clutch CL1, and the brake BK1, it is possible to generate a second mechanical point (a second mechanical transmission gear ratio γ2) at the high gear side in relation to the mechanical point (the first mechanical transmission gear ratio γ1) in the case where the engine 1 is directly connected to the second carrier 24. Accordingly, it is possible to improve the transmission efficiency during the operation of the high gear. That is, it is possible to realize a hybrid system capable of improving the fuel efficiency by the improvement of the transmission efficiency when the vehicle travels at a high speed.

(Backward Travel)

When the vehicle travels backward while the engine is used as a power source, the first rotation machine MG1 generates electric power as a generator, and the second rotation machine MG2 performs a power running operation as a motor outputting a negative torque and rotating reversely. When the battery charging state is sufficient, the vehicle may perform motor travelling in the single drive EV mode in which the second rotation machine MG2 rotates reversely. Further, the vehicle may travel backward in the dual drive EV mode by fixing the second carrier 24.

(Cooperative Gear Shift Control)

Next, the gear shift control of the hybrid vehicle driving device 1-1 will be described. When the HV_ECU 50 switches the HV high mode and the HV low mode, a cooperative gear shift control of simultaneously shifting the first planetary gear mechanism 10 and the second planetary gear mechanism 20 is performed. In the cooperative gear shift control, the HV_ECU 50 increases transmission gear ratio of one of the first planetary gear mechanism 10 and the second planetary gear mechanism 20 and decreases the transmission gear ratio of the other.

When the HV_ECU 50 switches the HV high mode to the HV low mode, the transmission gear ratio of the second planetary gear mechanism 20 is changed to the high gear side in synchronization with the switching of the mode. Thus, it is possible to decrease a change in transmission gear ratio by suppressing or reducing a non-continuous change in the entire transmission gear ratio of the vehicle 100 from the engine 1 to the driving wheel 32. Since a change in the transmission gear ratio from the engine 1 to the driving wheel 32 is suppressed, the engine rotation speed adjustment amount may be decreased or the engine rotation speed does not need to be adjusted in the gear shift operation. For example, the HV_ECU 50 shifts the first planetary gear mechanism 10 and the second planetary gear mechanism 20 in the cooperation state so that the entire transmission gear ratio of the vehicle 100 is continuously changed to the low gear side.

Meanwhile, when the HV_ECU 50 switches the HV low mode to the HV high mode, the transmission gear ratio of the second planetary gear mechanism 20 is changed to the low gear side in synchronization with the switching of the mode. Thus, it is possible to decrease a change in transmission gear ratio by suppressing or reducing a non-continuous change in the transmission gear ratio of the entire vehicle 100. For example, the HV_ECU 50 shifts the first planetary gear mechanism 10 and the second planetary gear mechanism 20 in the cooperation state so that the entire transmission gear ratio of the vehicle 100 is continuously changed to the high gear side.

The adjustment of the transmission gear ratio of the second planetary gear mechanism 20 is performed by, for example, the control of the rotation speed of the first rotation machine MG1. For example, the HV_ECU 50 controls the first rotation machine MG1 so that the transmission gear ratio between the input shaft 2 and the counter drive gear 25 is continuously changed. Thus, the entire transmission device including the planetary gear mechanisms 10 and 20, the first rotation machine MG1, the clutch CL1, and the brake BK1, that is, the transmission device including the differential unit and the transmission unit is operated as an electric continuously variable transmission.

When the accelerator opening degree is constant (also in an accelerator OFF state), the hybrid vehicle driving device 1-1 performs an equal power shift operation in which the engine rotation speed and the engine torque do not change before, during, and after the gear shift operation. In the equal power shift operation, the engine 1 is controlled so that the output torque and the engine rotation speed of the engine 1 are constant when the first planetary gear mechanism 10 is shifted by the brake BK1 and the clutch CL1. Here, the state where the output torque of the engine 1 is controlled to be constant includes a state where the output torque of the engine 1 is maintained at a torque within a predetermined range, for example a state where the output torque is maintained at a torque within several percentage range with respect to a predetermined torque. The same applies to the case where the engine rotation speed is controlled to be constant. Further, the output torque or the engine rotation speed of the engine 1 may be changed at a change rate smaller than a predetermined value in the equal power shift operation. Since the equal power shift operation is performed, the operation point of the engine 1 may be located constantly on the optimal fuel efficiency line, for example. When it is assumed that the vehicle speed is constant and the loss of the HV low mode is equal to the loss of the HV high mode, the torque of the output shaft does not change before and after the equal power shift operation.

Here, when the first planetary gear mechanism 10 is shifted by the switching device including the clutch CL1 and the brake BK1, there is a possibility that the shift shock is generated by a fluctuation of a torque at the output of the transmission unit, or the engine rotation speed fluctuates. For example, the shift shock is generated or the undershoot is generated which decreases the engine rotation speed or the MG1 rotation speed in the up-shift operation as described below with reference to FIGS. 9 and 10. Note that the undershoot indicates a state where the actual rotation speed becomes a negative rotation speed side with respect to the target rotation speed or the desired rotation speed or the rotation speed change rate changes to the negative side value.

Figure 9:
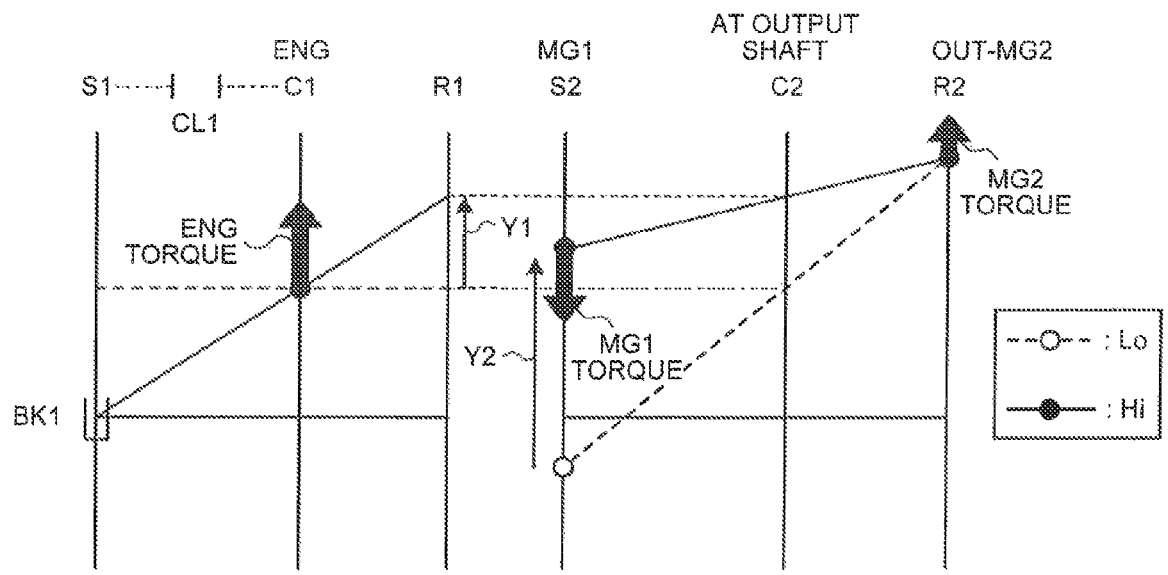
FIG. 9 is an alignment chart according to an up-shift operation while HV travelling.
Figure 10:
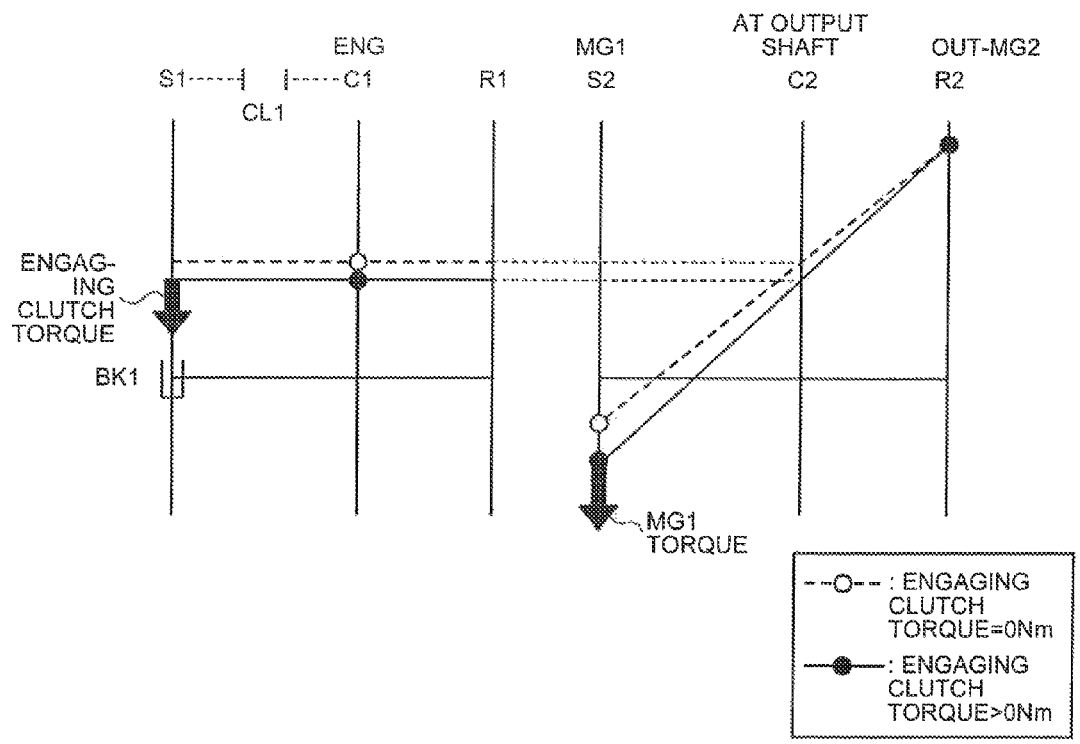
FIG. 10 is an alignment chart illustrating a fluctuation in the rotation speed during the up-shift operation while HV travelling.
Figure 11:
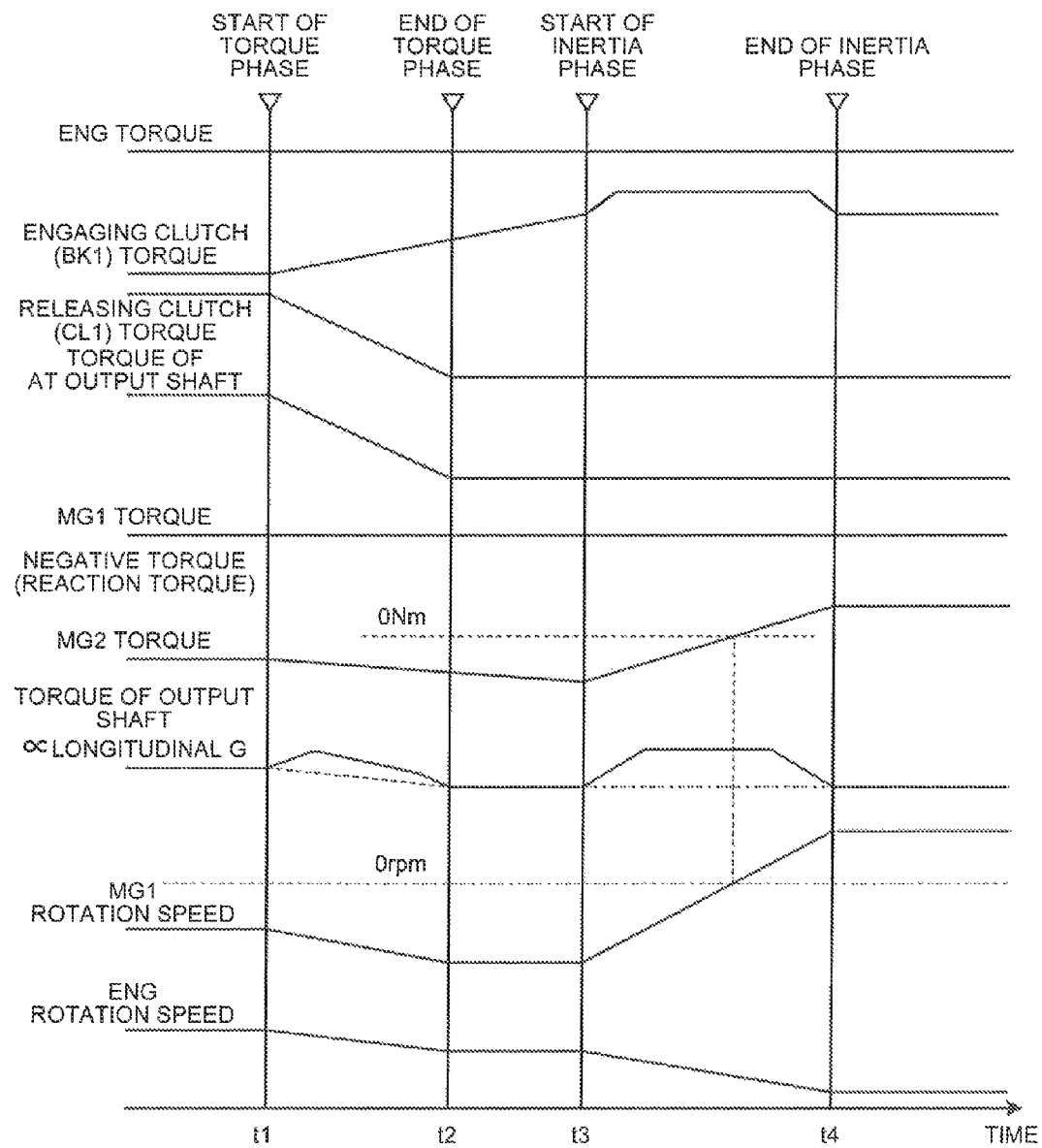
FIG. 11 is an explanatory diagram illustrating undershoot and a shift shock during the up-shift operation.
Figure 12:
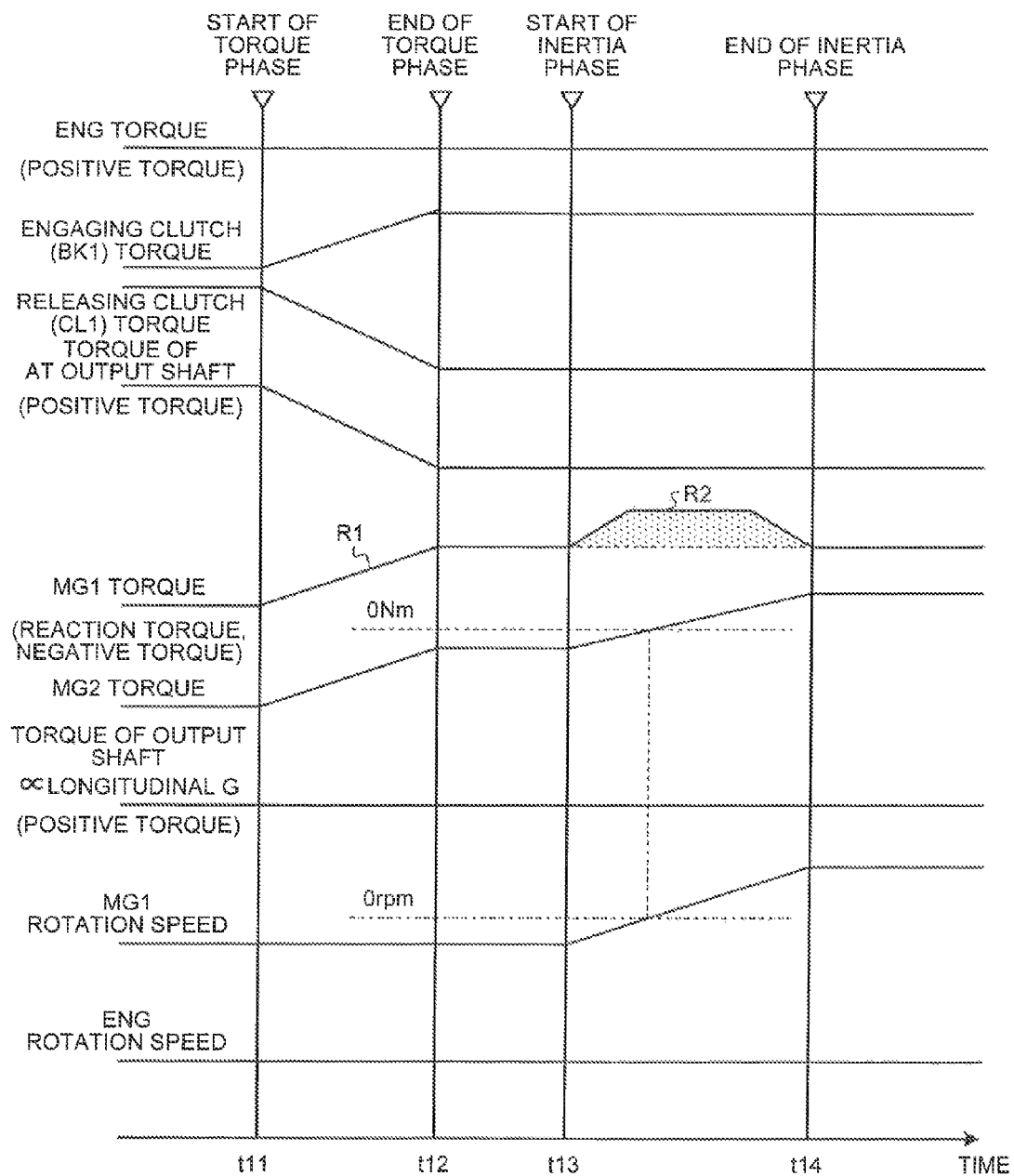
FIG. 12 is a time chart according to an up-shift control of the first embodiment.

FIG. 9 is an alignment chart according to the up-shift operation while HV travelling, FIG. 10 is an alignment chart illustrating a fluctuation in the rotation speed during the up-shift operation while HV travelling, FIG. 11 is an explanatory diagram illustrating the undershoot and the shift shock during the up-shift operation, and FIG. 12 is a time chart according to the up-shift control of the embodiment. FIGS. 9 to 12 illustrate the up-shift operation when the vehicle travels while the accelerator opening degree is constant.

In FIGS. 11 and 12, the horizontal axis indicates the time. Further, a torque of an engaging clutch indicates the engaging torque of the brake BK1, and a torque of a releasing clutch indicates the engaging torque of the clutch CL1. The torque of the output shaft indicates the output torque of the second ring gear 23. The longitudinal G of the vehicle 100 is proportional to the torque of the output shaft. Furthermore, the MG2 torque is controlled so that the power balance becomes substantially zero for the equal power shift operation. Specifically, the MG2 torque is determined so that the value of "MG1 power+ MG2 power" becomes substantially zero. The period from the time t1 to the time t2 (in FIG. 12, the period from the time t11 to the time t12) is a torque phase, and the period from the time t3 to the time t4 (in FIG. 12, the period from the time t13 to the time t14) after the end of the torque phase is an inertia phase. The torque phase indicates the period until the inertia phase starts and after the transmission of the torque of the engaging clutch is started. The inertia phase indicates the period until the rotation speed of the first sun gear 11 becomes zero and after the generation of the differential rotation speed between the first sun gear 11 and the first carrier 14.

In FIG. 9, the dashed line indicates the rotation state in the HV low mode (before the gear shift operation), and the solid line indicates the rotation state in the HV high mode (after the gear shift operation). The engine torque applied to the first carrier 14 is the positive torque, and the engine 1 is in a drive state where the vehicle 100 is driven by the engine torque. Since the clutch CL1 is engaged before the gear shift operation and the brake BK1 is engaged after the gear shift operation, the engine torque (the positive torque) is transmitted from the first ring gear 13 to the second carrier 24. The first rotation machine MG1 outputs a reaction torque (a negative torque) with respect to the engine torque, and outputs an engine torque from the second ring gear 23.

When the first planetary gear mechanism 10 is shifted up, the HV_ECU 50 releases the clutch CL1 and engages the brake BK1. Thus, the differential operation of the first planetary gear mechanism 10 is allowed and the rotation of the first sun gear 11 is regulated. Accordingly, as illustrated in FIG. 9, the rotation speed of the first ring gear 13 increases (see the arrow Y1), and the rotation speed of the second carrier 24 connected to the first ring gear 13 increases. Further, the rotation speed (the MG1 rotation speed) of the second sun gear 21 increases (see the arrow Y2) with an increase in the rotation speed of the second carrier 24. The rotation speed increase amount of the second sun gear 21 is larger than the rotation speed increase amount of the first ring gear 13.

Here, as illustrated in FIG. 10, a problem arises in that the undershoot of the engine rotation speed or the MG1 rotation speed is generated at the torque phase after the up-shift operation is started. In FIG. 10, the dashed line indicates the rotation state where the torque of the engaging clutch as the engagement torque of the brake BK1 is 0 Nm (before the start of the engagement), and the solid line indicates the rotation state where the torque of the engaging clutch is larger than 0 Nm (after the start of the engagement). When the engagement of the brake BK1 is started, the torque of the engaging clutch is applied to the first sun gear 11. Thus, the torque of the AT output shaft, that is, the torque transmitted from the first ring gear 13 to the second carrier 24 decreases.

As illustrated in FIG. 11, when the torque phase proceeds while the torque of the engaging clutch increases and the torque of the releasing clutch (the engaging torque of the clutch CL1) decreases, the torque of the AT output shaft becomes the high gear side torque compared to the torque before the gear shift operation is started, and hence the magnitude of the torque of the AT output shaft decreases. In this case, when the MG1 torque (the reaction torque) is constant, the rotation speed of the AT output shaft (the second carrier 24) decreases with a decrease in the torque of the AT output shaft, and hence the undershoot is generated in which the MG1 rotation speed and the engine rotation speed decrease. In this way, when the engine rotation speed fluctuates, there is a possibility that the equal power shift operation is not established.

Further, when the reaction torque of the first rotation machine MG1 is not adjusted, the shift shock is generated at the inertia phase. As illustrated in FIG. 11, when the MG1 torque is maintained at the constant value at the inertia phase, the engine rotation speed decreases. Further, the inertia torque caused by a fluctuation in the rotation speed of the first rotation machine MG1 is transmitted to the output shaft (the second ring gear 23), and hence the shift shock is generated due to a fluctuation in the torque of the output shaft.

The hybrid vehicle driving device 1-1 according to the embodiment corrects the MG1 torque at the torque phase (in FIG. 12, the period from the time t11 to the time t12) after the gear shift operation is started while HV travelling. Thus, a fluctuation in the engine rotation speed at the torque phase is suppressed. Specifically, the HV_ECU 50 corrects the reaction torque of the first rotation machine MG1 so that a fluctuation in the MG1 rotation speed can be suppressed at the torque phase after the up-shift operation of the first planetary gear mechanism 10 is started by the brake BK1 and the clutch CL1 while the vehicle travels by using the engine 1 as a power source.

Figure 13:
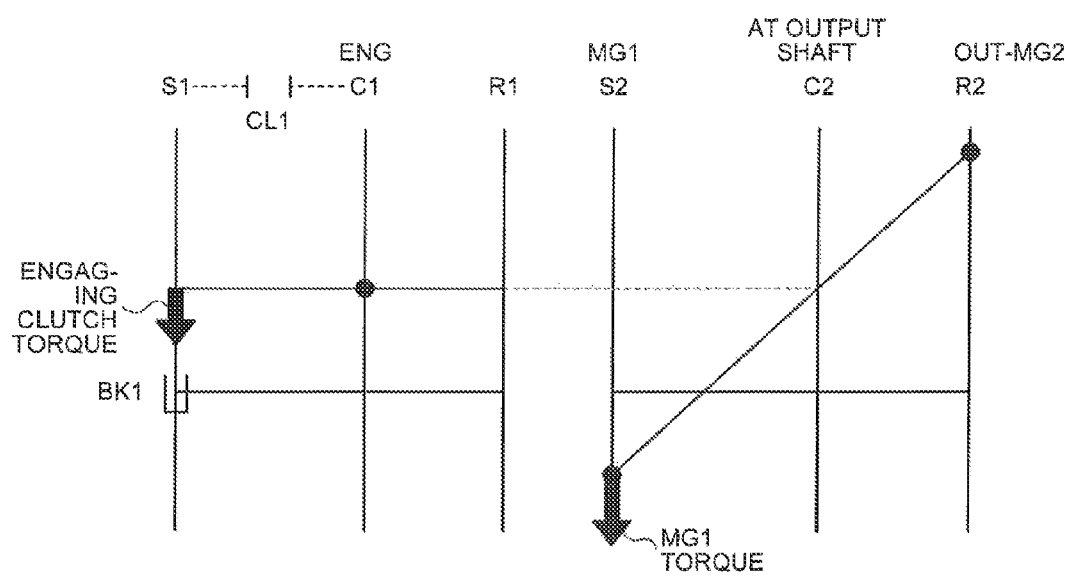
FIG. 13 is a diagram illustrating a state where undershoot is suppressed in an up-shift torque phase.

As indicated by Reference Sign R1 of FIG. 12, a correction of decreasing the magnitude of the MG1 torque, that is, a correction of decreasing the reaction torque is performed at the torque phase. The HV_ECU 50 decreases the reaction torque of the first rotation machine MG1 in response to the decrease amount of the torque of the AT output shaft at the torque phase. FIG. 13 is a diagram illustrating a state where the undershoot is suppressed at the up-shift torque phase. As illustrated in FIG. 13, a decrease in the MG1 rotation speed and a decrease in the engine rotation speed are suppressed by decreasing the reaction torque of the first rotation machine MG1 at the torque phase. Further, since the reaction torque of the first rotation machine MG1 decreases with respect to a decrease in the torque of the AT output shaft at the torque phase, a fluctuation in the torque of the output shaft is suppressed, and hence the shift shock is reduced.

Figure 14:
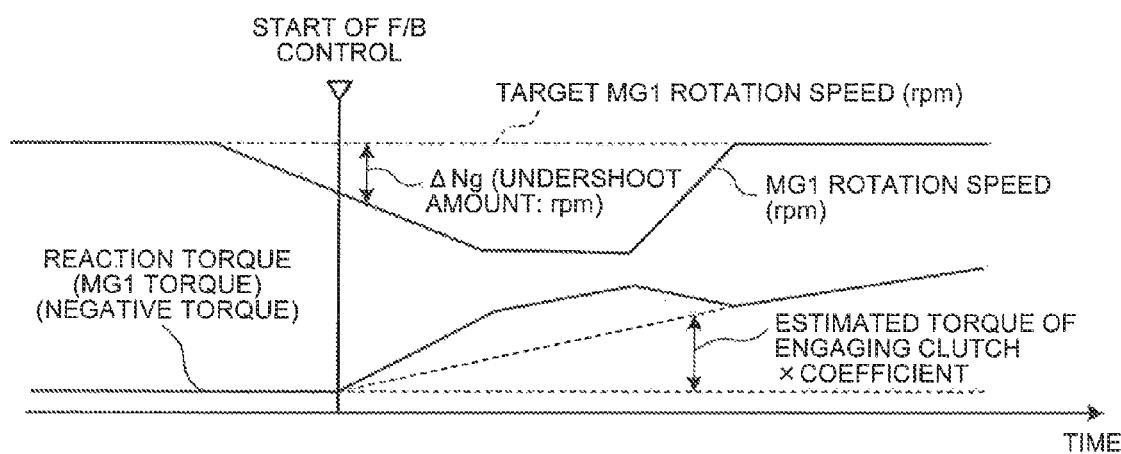
FIG. 14 is a time chart according to an MG1 torque control in an up-shift torque phase.

FIG. 14 is a time chart according to the MG1 torque control at the up-shift torque phase. The start of the torque phase is detected based on the undershoot amount $\Delta Ng$ of the MG1 rotation speed. The undershoot amount $\Delta Ng$ indicates a rotation speed difference between the target MG1 rotation speed and the actual MG1 rotation speed. Here, the target MG1 rotation speed may be set to, for example, the MG1 rotation speed when the gear shift operation is started.

The HV_ECU 50 determines that the torque phase is started when the undershoot amount $\Delta Ng$ is a predetermined value or more. The predetermined value is previously set to a value of a level in which the driver does not feel uncomfortable. For example, the value is several tens of rpm. As an example, the predetermined value may be set to 50 rpm. The HV_ECU 50 corrects the MG1 torque at the torque phase based on, for example, the following equations (1) to (3).

$$MG1 \text{ torque} = F/F \text{ term} + F/B \text{ term} \quad (1)$$

$$F/F \text{ term} = \text{base } MG1 \text{ torque} + \text{estimated torque of the engaging clutch} \times \text{coefficient} \quad (2)$$

$$F/B \text{ term} = Kp \times \Delta Ng + Kd \times d/dt(\Delta Ng) + Ki \times \int (\Delta Ng) dt \quad (3)$$

Here, the base MG1 torque indicates, for example, the MG1 torque before the gear shift operation. Further, Kp, Kd, and Ki respectively indicate the coefficients of the PID control.

The HV_ECU 50 performs a feed-back (F/B) control (PID control) of the MG1 torque so that the undershoot amount $\Delta Ng$ becomes zero at the torque phase.

Further, the HV_ECU 50 decreases the MG1 torque by a feed-forward (F/F) control. The state where the torque phase starts indicates a state where the transmission of the torque of the engaging clutch starts. Since the engagement oil pressure of the brake BK1 is increased at a predetermined rate, the transmission degree of the torque of the engaging clutch may be estimated in some degree. For this reason, the HV_ECU 50 decreases the reaction torque of the first rotation machine MG1 by the feed-forward control in response to the amount of the estimated torque of the engaging clutch. The term of F/F is calculated by multiplying the estimated torque of the engaging clutch by the coefficient of the gear ratio of the planetary gear mechanisms 10 and 20. The initial responsiveness at the torque phase is satisfactory because the rotation speed calculation delay does not exist in contrast to the term of F/B.

Since the deviation amount between the estimated torque of the engaging clutch and the actual value appears in a change of the undershoot amount $\Delta Ng$, the correction can be performed by the term of F/B. Furthermore, the torque of the engaging clutch may be estimated based on the elapse time from the start of the gear shift operation. It is estimated that the torque of the engaging clutch increases as the elapse time increases. Further, the torque of the engaging clutch may be estimated from the engaging oil pressure instruction value. It is estimated that the torque of the engaging clutch increases as the engaging oil pressure instruction value increases.

Further, the hybrid vehicle driving device 1-1 decreases the reaction torque of the first rotation machine MG1 in response to the inertia torque caused by a change in the rotation speed at the inertia phase (from the time t13 to the time t14) as indicated by Reference Sign R2 of FIG. 12. Thus, a fluctuation in the torque of the output shaft is suppressed.

Figure 15:
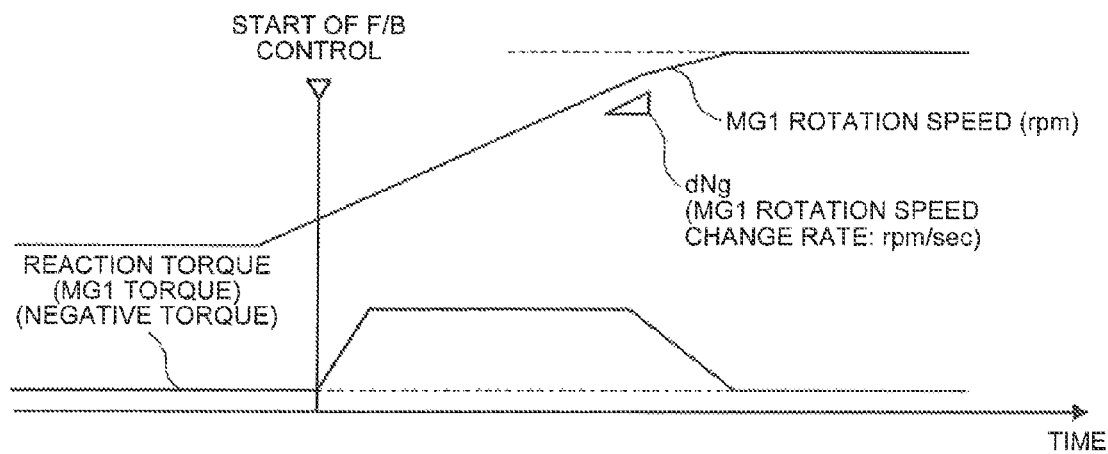
FIG. 15 is a time chart according to an MG1 torque control in an up-shift inertia phase.

FIG. 15 is a time chart according to the MG1 torque control at the up-shift inertia phase. The start of the inertia phase is detected based on the MG1 rotation speed increase amount. For example, the HV_ECU 50 determines that the inertia phase starts at the time point at which the MG1 rotation speed increase amount with respect to the rotation speed before the gear shift operation becomes a predetermined value or more. For example, the HV_ECU 50 corrects the MG1 torque at the inertia phase based on the following equations (4) to (6).

$$MG1 \text{ torque} = F/F \text{ term} + F/B \text{ term} \quad (4)$$

$$F/F \text{ term} = \text{target } dNg \times \text{coefficient} \quad (5)$$

$$F/B \text{ term} = Kp \times \Delta dNg + Kd \times d/dt(\Delta dNg) + Ki\int(\Delta dNg)dt \quad (6)$$

Here, dNg is the change rate (hereinafter, simply referred to as the "rotation speed change rate") of the MG1 rotation speed. The target value (the target dNg) of the rotation speed change rate dNg is set in advance. $\Delta dNg$ is calculated by the following equation (7), and is the deviation amount of the actual rotation speed change rate (the actual dNg) with respect to the target dNg. Note that the coefficients Kp, Kd, and Ki of the PID control of the above-described equation (6) may be different from the coefficients Kp, Kd, and Ki of the above-described equation (3).

$$\Delta dNg = \text{target } dNg - \text{actual } dNg \quad (7)$$

At the inertia phase, the MG1 torque is controlled so that the rotation speed change rate dNg is controlled on target. In the term of F/F, a value obtained by multiplying a coefficient by the target dNg is output as the inertia torque that satisfies the target dNg. According to the F/F control, the initial responsiveness at the inertia phase is satisfactory because the rotation speed calculation delay does not exist. The deviation amount between the target dNg and the actual dNg is corrected by the term of F/B. Furthermore, the magnitude of the target dNg at the end of the inertia phase is set to a value smaller than before in order to suppress the engagement shock. That is, the HV_ECU 50 decreases the rotation speed change rate dNg when the brake BK1 is completely engaged. Thus, it is possible to suppress the shock caused by a change in the inertia torque when the brake BK1 is completely engaged. Furthermore, when the power change amount of the first rotation machine MG1 at the inertia phase is absorbed by the MG2 torque, the torque of the output shaft changes. Accordingly, it is desirable to absorb the power change amount of the first rotation machine MG1 at the inertia phase by an electric power delivery between the first rotation machine MG1 and the battery.

Figure 16:
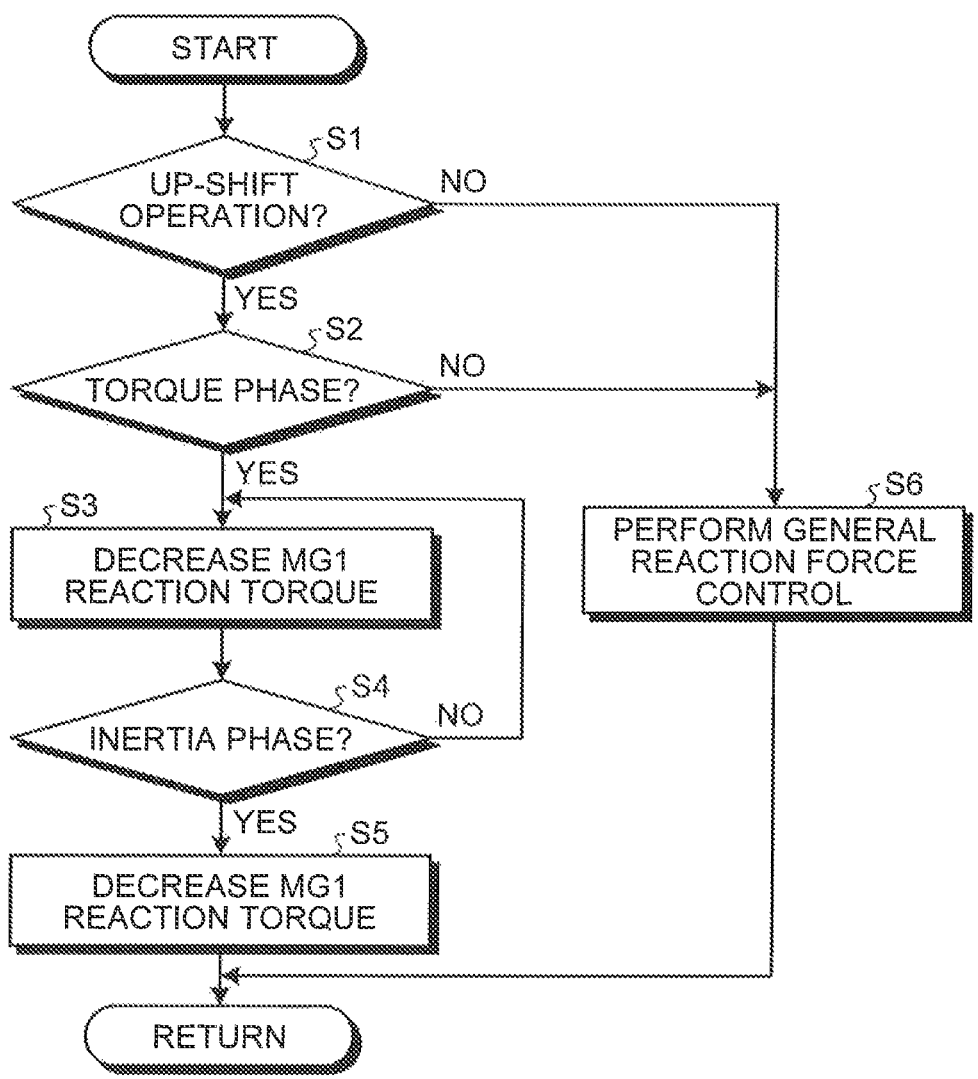
FIG. 16 is a flowchart illustrating an operation of the up-shift control according to the first embodiment.

Next, the operation of the up-shift control of the embodiment will be described with reference to FIG. 16. FIG. 16 is a flowchart illustrating the operation of the up-shift control according to the first embodiment. The control flow illustrated in FIG. 16 is performed, for example, at a predetermined interval while the vehicle travels.

In step S1, the HV_ECU 50 determines whether the up-shift operation is performed. The HV_ECU 50 determines whether the up-shift operation is performed while HV travelling which uses the engine 1 as a power source. When it is determined that the up-shift operation is performed (step S1-Y) as the determination result of step S1, the routine proceeds to step S2. Meanwhile, when it is determined that the up-shift operation is not performed (step S1-N), the routine proceeds to step S6.

In step S2, the HV_ECU 50 determines whether the current phase is the torque phase. The HV_ECU 50 determines whether the torque of the engaging clutch is transmitted, that is, the torque phase is generated. For example, as described above by referring to FIG. 14, the HV_ECU 50 may determine whether the current phase is the torque phase based on the undershoot amount $\Delta Ng$. Further, it may be determined whether the current phase is the torque phase based on the elapse time from the start of the gear shift operation instead of this determination. When it is determined that the current phase is the torque phase (step S2-Y) as the determination result of step S2, the routine proceeds to step S3. Meanwhile, when it is determined that the current phase is not the torque phase (step S2-N), the routine proceeds to step S6.

In step S3, the HV_ECU 50 performs a control of decreasing the reaction torque of the first rotation machine MG1. When the MG1 torque does not change with respect to an increase in the torque of the engaging clutch, the MG1 rotation speed decreases. This change occurs in the direction opposite to the change of the rotation speed by the proceeding of the gear shift operation. That is, a problem arises in that the up-shift time easily increases due to the undershoot. Further, when the MG1 rotation speed decreases, the engine rotation speed also decreases, and hence the equal power shift operation is not easily performed. The HV_ECU 50 detects a decrease in the MG1 rotation speed at the torque phase and decreases the MG1 reaction torque so that the undershoot amount $\Delta Ng$ becomes zero. The HV_ECU 50 may decrease the MG1 reaction torque by at least one of the F/B control based on the undershoot amount $\Delta Ng$ and the F/F control based on the estimated torque of the engaging clutch at the torque phase. When the process of step S3 is performed, the routine proceeds to step S4.

In step S4, the HV_ECU 50 determines whether the current phase is the inertia phase. In step S4, it is determined whether the output shaft rotation speed of the transmission unit is changed, that is, the inertia phase is generated. In the embodiment, it is determined that the inertia phase starts at the time point at which the MG1 rotation speed increase amount becomes a predetermined value or more. When it is determined that the current phase is the inertia phase (step S4-Y) as the determination result of step S4, the routine proceeds to step S5. Meanwhile, when it is determined that the current phase is not the inertia phase (step S4-N), the routine proceeds to step S3 so as to perform a control of decreasing the MG1 reaction torque at the torque phase.

In step S5, the HV_ECU 50 performs a control of decreasing the reaction torque of the first rotation machine MG1. The HV_ECU 50 decreases the reaction torque of the first rotation machine MG1 so that the inertia torque decreases at the inertia phase. Thus, it is possible to suppress the shift shock at the inertia phase caused when the inertia torque generated by a fluctuation in the MG1 rotation speed is transmitted to the output shaft. For example, the HV_ECU 50 may control the AT input shaft rotation speed (the engine rotation speed) by the F/B control of the MG1 torque so as to reduce a shock while setting the torque of the engaging clutch to a constant value at the inertia phase. When the process of step S5 is performed, this control flow ends.

In step S6, the HV_ECU 50 performs a general reaction force control. The HV_ECU 50 performs a predetermined MG1 torque control. When the process of step S6 is performed, this control flow ends.

As described above, it is possible to obtain an effect that a fluctuation in the engine rotation speed in the up-shift operation is suppressed or an effect that the shift shock caused by a fluctuation in the output torque (the torque of the output shaft)

in the up-shift operation is suppressed by the gear shift control of the hybrid vehicle driving device 1-1 according to the embodiment. Further, since the hybrid vehicle driving device 1-1 suppresses the undershoot of the MG1 rotation speed or the like in the up-shift operation, it is possible to obtain an effect that an increase in gear shift time is suppressed.

Furthermore, the hybrid vehicle driving device 1-1 may increase the MG1 rotation speed in addition to the suppression of the undershoot of the MG1 rotation speed at the torque phase. For example, the MG1 rotation speed may be increased at the torque phase within the range in which the driver does not feel uncomfortable. Thus, the up-shift time may be shortened. As an example, the MG1 rotation speed at the torque phase may be increased by a predetermined value with respect to the MG1 rotation speed when the gear shift operation starts. The predetermined value may be set to, for example, the value equal to the predetermined value used to determine whether the torque phase starts based on the undershoot amount ΔNg.

The hybrid vehicle driving device 1-1 may switch the HV high mode and the HV low mode by the transmission unit including the first planetary gear mechanism 10, the clutch CL1, and the brake BK1, and may improve the transmission efficiency of the vehicle 100. Further, the second planetary gear mechanism 20 as the differential unit is connected in series to the rear stage of the transmission unit. Since the first planetary gear mechanism 10 is in the overdrive state, there is an advantage that the torque of the first rotation machine MG1 does not need to be a high torque.

Further, since the rotation of the input component of the second planetary gear mechanism 20 can be regulated by the engagement of the clutch CL1 and the brake BK1 of the transmission unit, the vehicle may travel in the dual motor EV mode. For this reason, there is no need to provide a separate additional clutch for realizing the dual motor EV mode, and hence the configuration is simplified. In the layout of the embodiment, a large deceleration ratio of the second rotation machine MG2 may be obtained. Further, a compact arrangement may be realized by the FF or RR layout.

Second Embodiment

A second embodiment will be described with reference to FIGS. 17 to 24. In the second embodiment, the same reference sign will be given to the component having the same function as the first embodiment, and the repetitive description thereof will be omitted. The mechanical configuration of the vehicle 100 according to the embodiment may be the same as that of the vehicle 100 according to the first embodiment.

The second embodiment is different from the first embodiment in that the MG1 torque is corrected in the down-shift operation. When the MG1 torque is corrected in the down-shift operation, it is possible to suppress a fluctuation in the torque of the output shaft or the undershoot of the engine rotation speed or the like during the gear-shift operation.

As described below with reference to FIGS. 17 and 18, when the down-shift operation of the transmission unit is performed, the undershoot is generated in which the engine rotation speed or the MG1 rotation speed decreases or the shift shock is generated due to a fluctuation in the torque of the output shaft.

Figure 17:
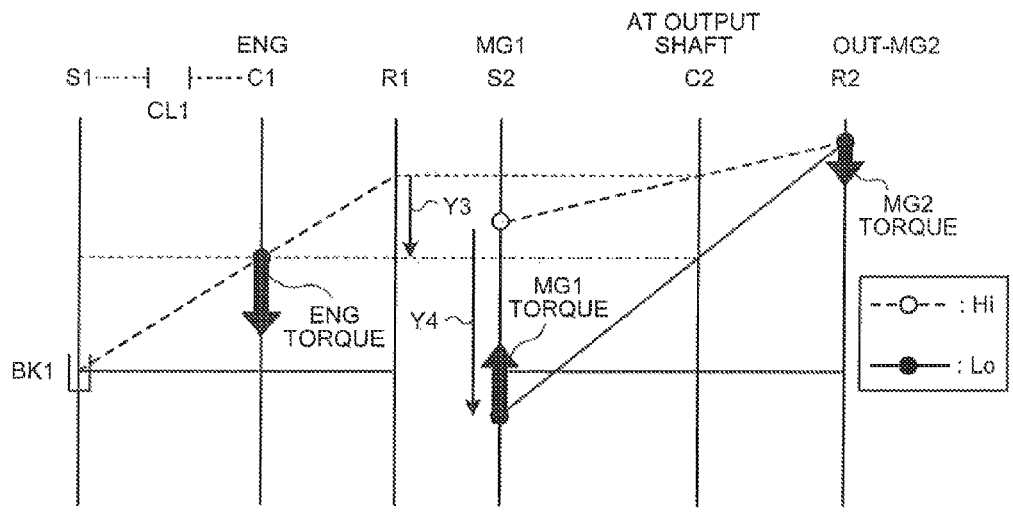
FIG. 17 is an alignment chart according to a down-shift while HV travelling.
Figure 18:
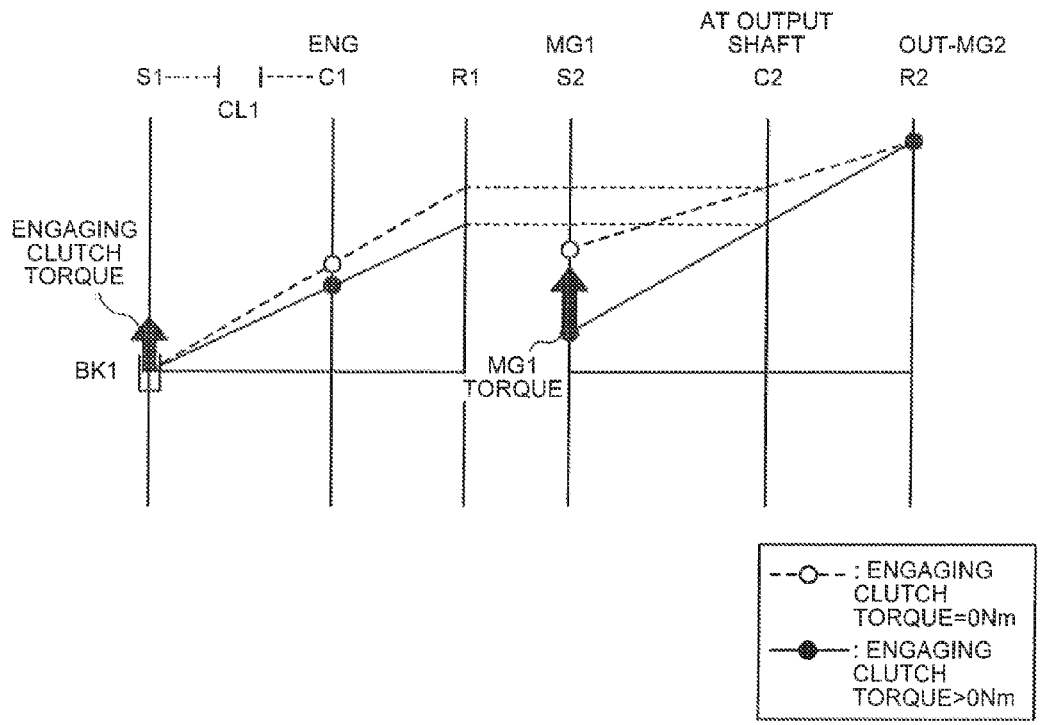
FIG. 18 is an alignment chart illustrating a fluctuation in the rotation speed during a down-shift operation while HV travelling.
Figure 19:
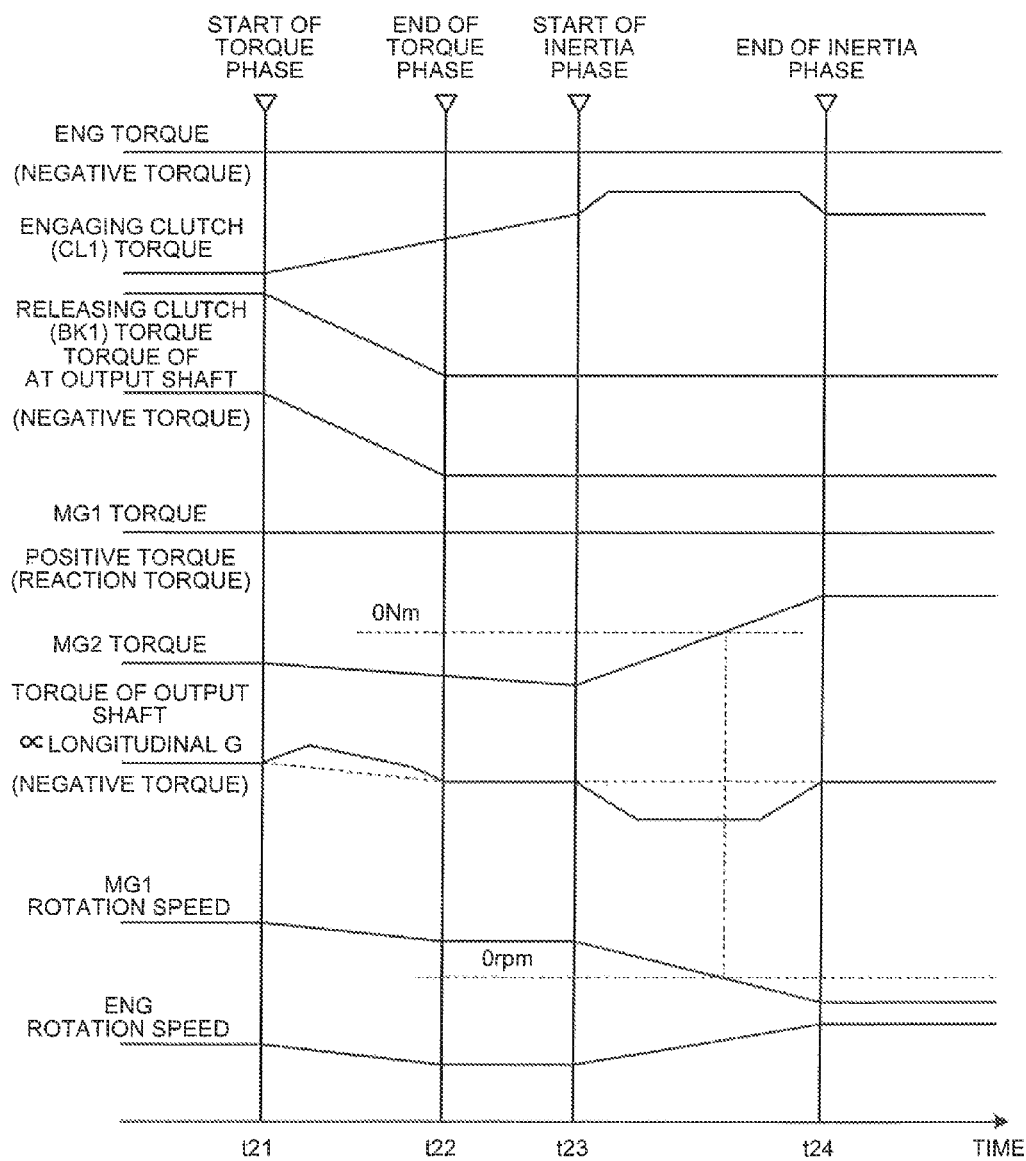
FIG. 19 is an explanatory diagram illustrating undershoot and a shift shock during the down-shift operation.
Figure 20:
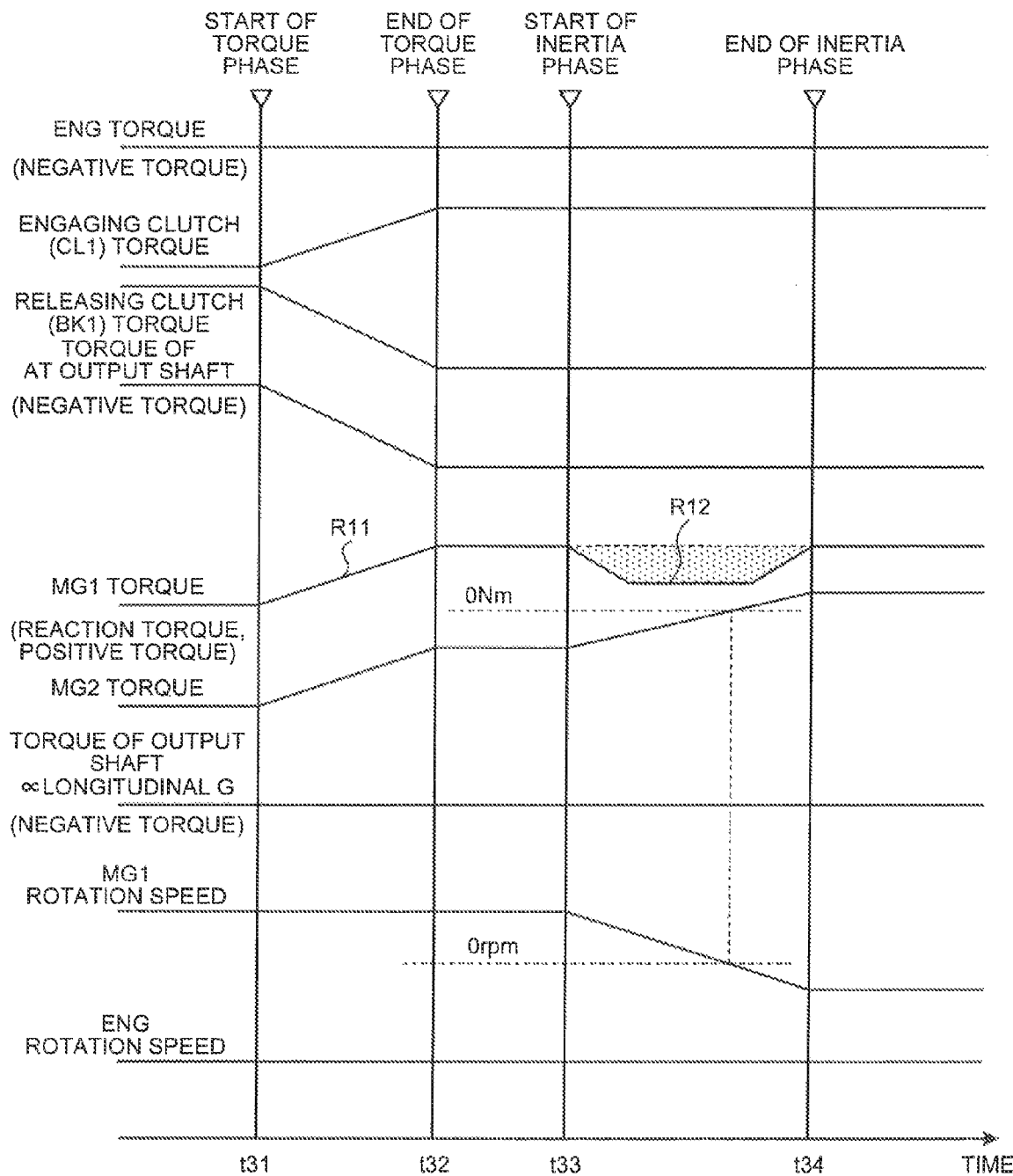
FIG. 20 is a time chart according to a down-shift control of a second embodiment.

FIG. 17 is an alignment chart according to the down-shift operation while HV travelling, FIG. 18 is an alignment chart illustrating a fluctuation in the rotation speed in the down-shift operation while HV travelling, FIG. 19 is an explanatory diagram illustrating the undershoot and the shift shock in the down-shift operation, and FIG. 20 is a time chart according to the down-shift control of the embodiment. FIGS. 17 to 20 illustrate the down-shift operation when the vehicle travels while the accelerator opening degree is constant.

In FIGS. 19 and 20, the horizontal axis indicates the time. Further, the torque of the engaging clutch indicates the engaging torque of the clutch CL1, and the torque of the releasing clutch indicates the engaging torque of the brake BK1. The torque of the output shaft indicates the output torque of the second ring gear 23. The longitudinal G of the vehicle 100 is proportional to the torque of the output shaft. Furthermore, the MG2 torque is controlled so that the power balance becomes substantially zero for the equal power shift operation. Specifically, the MG2 torque is determined so that the value of "MG1 power+MG2 power" becomes substantially zero. The period from the time t21 to the time t22 (in FIG. 20, the period from the time t31 to the time t32) is the torque phase, and the period from the time t23 after the end of the torque phase to the time t24 (in FIG. 20, the period from the time t33 to the time t34) is the inertia phase.

In FIG. 17, the dashed line indicates the rotation state in the HV high mode (before the gear shift operation), and the solid line indicates the rotation state in the HV low mode (after the gear shift operation). The engine torque applied to the first carrier 14 is a negative torque, and the engine 1 is maintained in a state where the engine is driven by the torque transmitted from the driving wheel 32. Since the brake BK1 is engaged before the gear shift operation and the clutch CL1 is engaged after the gear shift operation, the engine torque (the negative torque) is transmitted from the first ring gear 13 to the second carrier 24. The first rotation machine MG1 outputs a reaction torque (a positive torque) with respect to the engine torque and outputs the engine torque from the second ring gear 23.

When the down-shift operation of the first planetary gear mechanism 10 is performed, the HV_ECU 50 releases the brake BK1 and engages the clutch CL1. Thus, the rotation of the first sun gear 11 is allowed and the differential operation of the first planetary gear mechanism 10 is regulated. Accordingly, as illustrated in FIG. 17, the rotation speed of the first ring gear 13 decreases (see the arrow Y3), and the rotation speed of the second carrier 24 connected to the first ring gear 13 decreases. Further, the rotation speed (the MG1 rotation speed) of the second sun gear 21 decreases (see the arrow Y4) in response to a decrease in the rotation speed of the second carrier 24. The rotation speed decrease amount of the second sun gear 21 is larger than the rotation speed decrease amount of the first ring gear 13.

Here, a problem arises in that the undershoot of the engine rotation speed or the MG1 rotation speed is generated at the torque phase after the down-shift operation is started as illustrated in FIG. 18. In FIG. 18, the dashed line indicates the rotation state where the torque of the engaging clutch as the engaging torque of the clutch CL1 is 0 Nm (before the start of the engagement), and the solid line indicates the rotation state where the torque of the engaging clutch is larger than 0 Nm (after the start of the engagement). When the engagement of the clutch CL1 is started, the torque of the engaging clutch is applied to the first sun gear 11 and the first carrier 14. Thus, the torque of the AT output shaft, that is, the negative torque transmitted from the first ring gear 13 to the second carrier 24 increases.

As illustrated in FIG. 19, when the torque phase proceeds while the torque of the engaging clutch increases and the torque of the releasing clutch (the engaging torque of the brake BK1) decreases, the torque of the AT output shaft becomes the lower gear side torque (the large negative torque) compared to the torque before the gear shift operation is started, and hence the magnitude of the torque of the AT output shaft decreases. In this case, when the MG1 torque (the reaction torque) is constant, the rotation speed of the AT output shaft (the second carrier 24) decreases with a decrease in the torque of the AT output shaft, and hence the undershoot is generated in which the MG1 rotation speed and the engine rotation speed decrease. In this way, when the engine rotation speed fluctuates, there is a possibility that the equal power shift operation is not established.

Further, when the reaction torque of the first rotation machine MG1 is not adjusted, the shift shock is generated at the inertia phase. As illustrated in FIG. 19, when the MG1 torque is maintained at the constant value at the inertia phase, the engine rotation speed increases. Further, the inertia torque caused by a fluctuation in the rotation speed of the first rotation machine MG1 is transmitted to the output shaft (the second ring gear 23), and hence the shift shock is generated due to a fluctuation in the torque of the output shaft.

The hybrid vehicle driving device 1-1 according to the embodiment corrects the MG1 torque at the torque phase (in FIG. 20, the period from the time t31 to the time t32) after the gear shift operation is started while HV travelling. Thus, a fluctuation in the engine rotation speed at the torque phase is suppressed. Specifically, the HV_ECU 50 corrects the reaction torque of the first rotation machine MG1 so that a fluctuation in the MG1 rotation speed can be suppressed at the torque phase after the down-shift operation of the first planetary gear mechanism 10 is started by the brake BK1 and the clutch CL1 while the vehicle travels by using the engine 1 as a power source.

Figure 21:
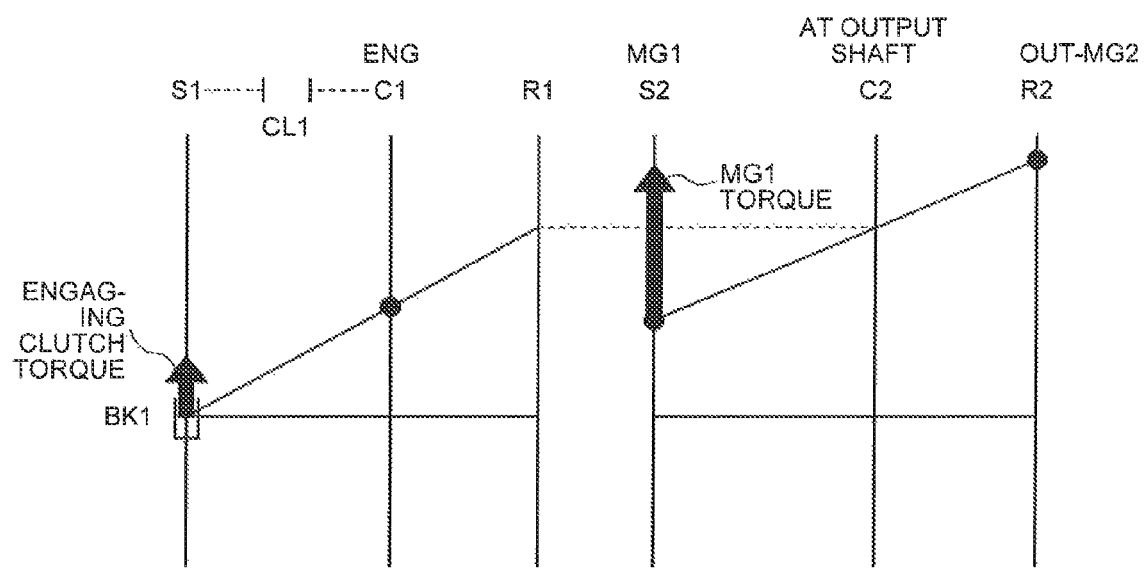
FIG. 21 is a diagram illustrating a state where undershoot is suppressed in a down-shift torque phase.

As indicated by Reference Sign R11 of FIG. 20, a correction of increasing the magnitude of the MG1 torque, that is, a correction of increasing the reaction torque is performed at the torque phase. The HV_ECU 50 increases the reaction torque of the first rotation machine MG1 in response to the decrease amount of the torque of the AT output shaft at the torque phase. FIG. 21 is a diagram illustrating the suppression of the undershoot at the down-shift torque phase. As illustrated in FIG. 21, a decrease in the MG1 rotation speed and a decrease in the engine rotation speed are suppressed by increasing the reaction torque of the first rotation machine MG1 at the torque phase. Further, since the reaction torque of the first rotation machine MG1 increases with respect to a decrease in the torque of the AT output shaft at the torque phase, a fluctuation in the torque of the output shaft is suppressed, and hence the shift shock is reduced.

Figure 22:
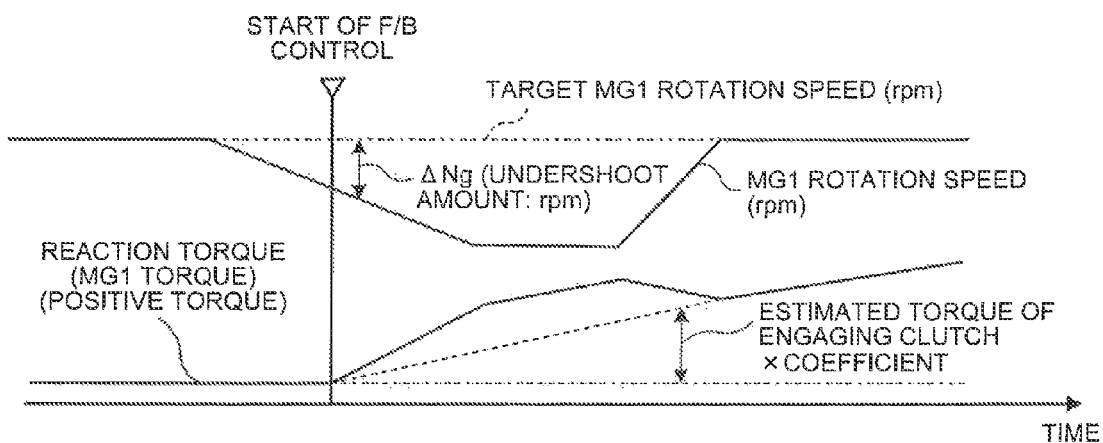
FIG. 22 is a time chart according to a MG1 torque control in a down-shift torque phase.

FIG. 22 is a time chart according to the MG1 torque control at the down-shift torque phase. The start of the torque phase is detected based on the undershoot amount ΔNg of the MG1 rotation speed. The undershoot amount ΔNg is a rotation speed difference between the target MG1 rotation speed and the actual MG1 rotation speed. Here, the target MG1 rotation speed may be set to, for example, the MG1 rotation speed when the gear shift operation is started.

The HV_ECU 50 determines that the torque phase is started when the undershoot amount ΔNg becomes a predetermined value or more. The predetermined value is previously set to a value of a level in which the driver does not feel uncomfortable. For example, the value is several tens of rpm. As an example, the predetermined value may be set to 50 rpm. The HV_ECU 50 corrects the MG1 torque at the torque phase based on, for example, the above-described equations (1) to (3). The HV_ECU 50 performs a feed-back (F/B) control (PID control) of the MG1 torque so that the undershoot amount ΔNg becomes zero at the torque phase.

Further, the HV_ECU 50 increases the MG1 torque by a feed-forward (F/F) control. The state where the torque phase starts indicates a state where the transmission of the torque of the engaging clutch starts. Since the engagement oil pressure of the clutch CL1 is increased at a predetermined rate, the transmission degree of the torque of the engaging clutch may be estimated in some degree. For this reason, the HV_ECU 50 increases the reaction torque of the first rotation machine MG1 according to the feed-forward control in response to the amount of the estimated torque of the engaging clutch. The term of F/F is calculated by multiplying the estimated torque of the engaging clutch by the coefficient of the gear ratio of the planetary gear mechanisms 10 and 20. The initial responsiveness at the torque phase is satisfactory because the rotation speed calculation delay does not exist in contrast to the term of F/B.

Since the deviation amount between the estimated torque of the engaging clutch and the actual value appears in a change of the undershoot amount ΔNg, the correction can be performed by the term of F/B. Note that the method of estimating the torque of the engaging clutch may be similar to that of the first embodiment.

Further, as indicated by Reference Sign R12 of FIG. 20, the hybrid vehicle driving device 1-1 decreases the reaction torque of the first rotation machine MG1 in response to the inertia torque caused by a fluctuation in the rotation speed at the inertia phase (from the time t33 to the time t34). Thus, a fluctuation in the torque of the output shaft is suppressed.

Figure 23:
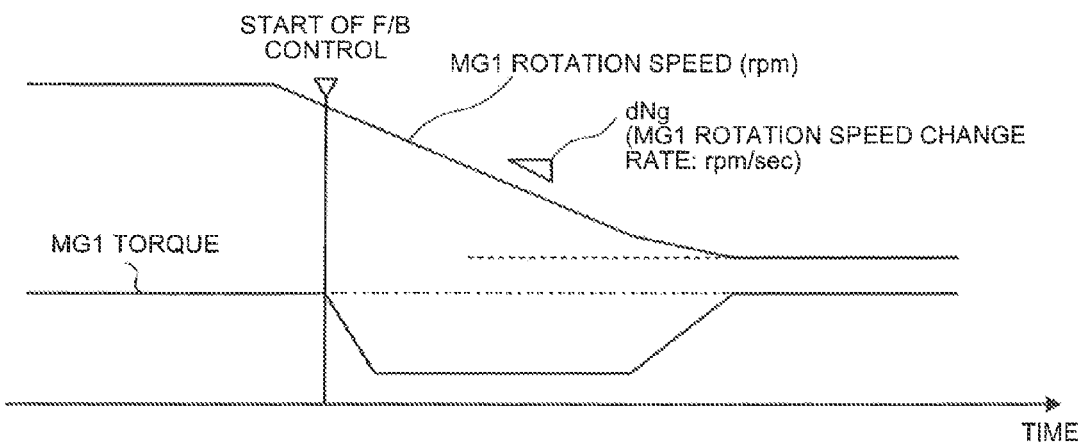
FIG. 23 is a time chart according to an MG1 torque control in a down-shift inertia phase.

FIG. 23 is a time chart according to the MG1 torque control at the inertia phase during the down-shift operation. The start of the inertia phase is detected based on the MG1 rotation speed decrease amount. For example, the HV_ECU 50 determines that the inertia phase is started at the time point at which the MG1 rotation speed decrease amount with respect to the rotation speed before the gear shift operation becomes a predetermined value or more. For example, the HV_ECU 50 corrects the MG1 torque at the inertia phase based on the above-described equations (4) to (6).

At the inertia phase, the MG1 torque is controlled so that the rotation speed change rate dNg is controlled on target. In the term of F/F, a value obtained by multiplying a coefficient by the target dNg is output as the inertia torque satisfying the target dNg. According to the F/F control, the initial responsiveness at the inertia phase is satisfactory because the rotation speed calculation delay does not exist. The deviation amount between the target dNg and the actual dNg is corrected by the term of F/B. Furthermore, the magnitude of the target dNg at the end of the inertia phase is set to a value smaller than before in order to suppress the engagement shock. That is, the HV_ECU 50 decreases the rotation speed change rate dNg when the clutch CL1 is completely engaged. Thus, it is possible to suppress the shock caused by a change in the inertia torque when the clutch CL1 is completely engaged.

Figure 24:
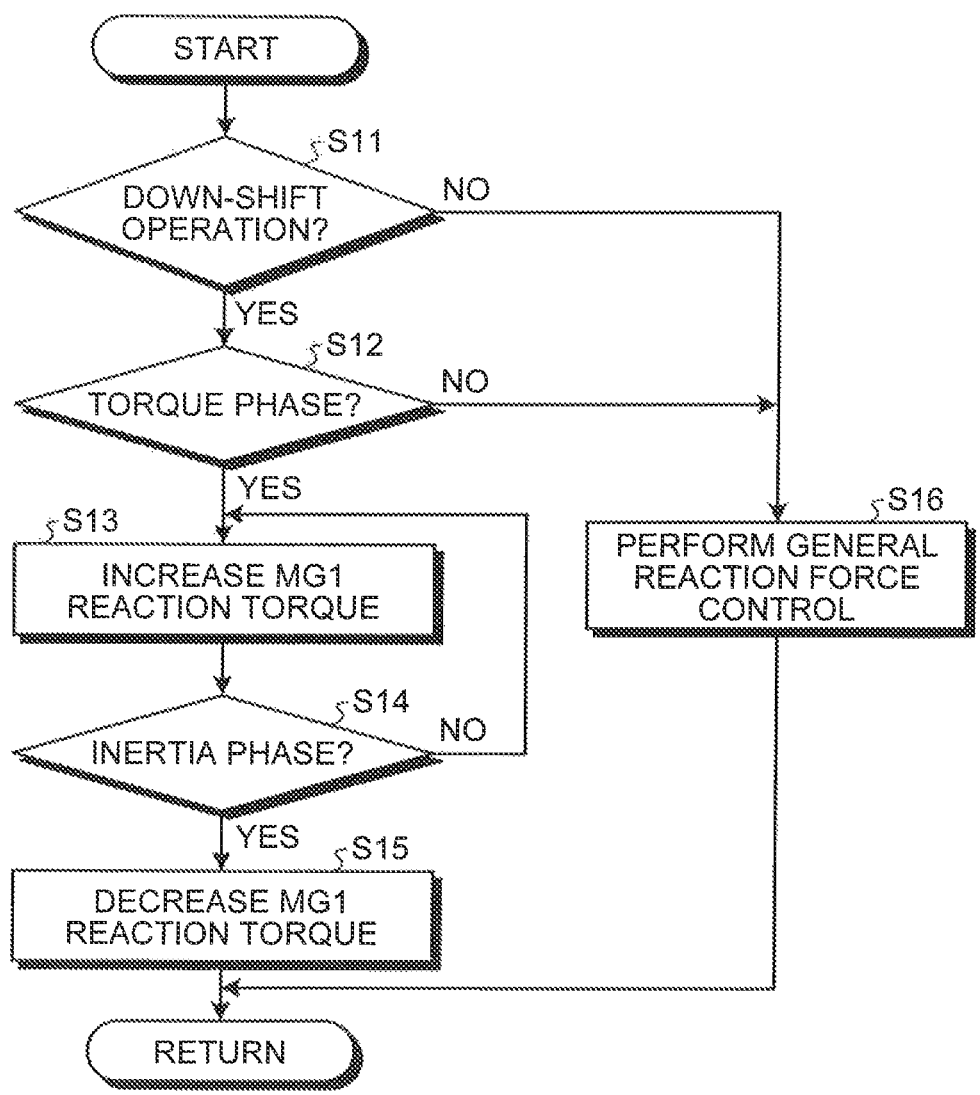
FIG. 24 is a flowchart illustrating an operation of a down-shift control according to the second embodiment.

Next, the operation of the down-shift control of the embodiment will be described with reference to FIG. 24. FIG. 24 is a flowchart illustrating the operation of the down-shift control according to the second embodiment. The control flow illustrated in FIG. 24 is performed, for example, at a predetermined interval while the vehicle travels.

In step S11, the HV_ECU 50 determines whether the down-shift operation is performed. The HV_ECU 50 determines whether the down-shift operation is performed while HV travelling which uses the engine 1 as a power source. When it is determined that the down-shift operation is performed (step S11-Y) as the determination result of step S11, the routine proceeds to step S12. Meanwhile, when it is determined that the down-shift operation is not performed (step S11-N), the routine proceeds to step S16.

In step S12, the HV_ECU 50 determines whether the current phase is the torque phase. The HV_ECU 50 determines whether the torque of the engaging clutch is transmitted, that is, the torque phase is generated. For example, as described above with reference to FIG. 22, the HV_ECU 50 may determine whether the current phase is the torque phase based on the undershoot amount ΔNg. Further, it may be determined whether the current phase is the torque phase based on the elapse time from the start of the gear shift operation instead of this determination. When it is determined that the current phase is the torque phase (step S12-Y) as the determination result of step S12, the routine proceeds to step S13. Meanwhile, when it is determined that the current phase is not the torque phase (step S12-N), the routine proceeds to step S16.

In step S13, the HV_ECU 50 performs a control of increasing the reaction torque of the first rotation machine MG1. When the MG1 torque does not change with respect to an increase in the torque of the engaging clutch, the MG1 rotation speed decreases. Further, when the MG1 rotation speed decreases, the engine rotation speed also decreases, and hence the equal power shift operation is not easily performed. The HV_ECU 50 detects a decrease in the MG1 rotation speed at the torque phase, and increases the MG1 reaction torque so that the undershoot amount ΔNg becomes zero. The HV_ECU 50 may increase the MG1 reaction torque by at least one of the F/B control based on the undershoot amount ΔNg and the F/F control based on the estimated torque of the engaging clutch at the torque phase. When the process of step S13 is performed, the routine proceeds to step S14.

In step S14, the HV_ECU 50 determines whether the current phase is the inertia phase. In step S14, it is determined whether the output shaft rotation speed of the transmission unit is changed, that is, the inertia phase is generated. In the embodiment, it is determined that the inertia phase is started at the time point at which the MG1 rotation speed decrease amount becomes a predetermined value or more. When it is determined that the current phase is the inertia phase (step S14-Y) as the determination result of step S14, the routine proceeds to step S15. Meanwhile, when it is determined that the current phase is not the inertia phase (step S14-N), the routine proceeds to step S13 and a control of increasing the MG1 reaction torque at the torque phase is performed.

In step S15, the HV_ECU 50 performs a control of decreasing the reaction torque of the first rotation machine MG1. The HV_ECU 50 decreases the reaction torque of the first rotation machine MG1 so as to decrease the inertia torque at the inertia phase. Thus, it is possible to suppress the shift shock at the inertia phase caused when the inertia torque generated by a fluctuation in the MG1 rotation speed is transmitted to the output shaft. For example, the HV_ECU 50 may control the AT input shaft rotation speed (the engine rotation speed) by the F/B control of the MG1 torque so as to reduce a shock while setting the torque of the engaging clutch to a constant value at the inertia phase. When the process of step S15 is performed, this control flow ends.

In step S16, the general reaction force control is performed by the HV_ECU 50. The HV_ECU 50 performs a predetermined MG1 torque control. When the process of step S16 is performed, this control flow ends.

As described above, the gear shift control of the hybrid vehicle driving device 1-1 according to the embodiment has an effect that a fluctuation in the engine rotation speed during the down-shift operation is suppressed or an effect that the shift shock caused by a fluctuation in the output torque (the torque of the output shaft) during the down-shift operation is suppressed.

First Modified Example of Embodiments

In the first embodiment and the second embodiment, the reaction torque of the first rotation machine MG1 is corrected so that the inertia torque of the first rotation machine MG1 corresponding to the target dNg becomes zero at the inertia phase (see the above-described equation (5)). However, instead of this configuration, a configuration may be employed in which the inertia torque of the first rotation machine MG1 is calculated from the actual rotation speed change rate dNg and the reaction torque of the first rotation machine MG1 is corrected so that the inertia torque becomes zero. Further, a configuration may be employed in which the inertia torque is calculated from the estimated rotation speed change rate dNg instead of the target dNg and the reaction torque of the first rotation machine MG1 is corrected so that the inertia torque becomes zero.

The rotation speed change rate dNg is estimated from, for example, the target gear shift time. It is estimated that the rotation speed change rate dNg decreases as the target gear shift time increases. Alternatively, the rotation speed change rate dNg may be calculated based on the vehicle speed. Since the differential rotation speed during the gear shift operation increases as the vehicle speed increases, it is estimated that the rotation speed change rate dNg is also large.

Second Modified Example of Embodiments

In the first embodiment and the second embodiment, the engagement oil pressure learning value may be corrected based on the timing at which the undershoot of the MG1 rotation speed is generated. The engagement oil pressure is an oil pressure in which the engagement of the brake BK1 or the clutch CL1 starts. A correction is performed in which the engagement oil pressure learning value decreases as the timing of the undershoot of the MG1 rotation speed becomes early and the engagement oil pressure learning value increases as the undershoot timing becomes late. By using the fact that the undershoot of the MG1 rotation speed is generated when the torque phase starts, the engagement oil pressure corresponding to torque transmission start timing may be detected with high precision, and hence the learning control may be performed with high precision.

Third Modified Example of Embodiments

In the first embodiment and the second embodiment, the start of the torque phase or the inertia phase is detected based on the change amount of the MG1 rotation speed, but the start of the torque phase or the inertia phase may be detected based on the change rate of the MG1 rotation speed. For example, it may be determined that the torque phase or the inertia phase is started when a magnitude of the change rate of the MG1 rotation speed is a predetermined value or more. The predetermined value may be set to a value in which the driver does not feel uncomfortable. For example, the value may be set to an upper limit value in which the driver does not feel uncomfortable.

Fourth Modified Example of Embodiments

In the first embodiment and the second embodiment, the engine 1 is used, but an engine different from the engine 1 may be mounted on the vehicle 100. Further, each of the first planetary gear mechanism 10 and the second planetary gear mechanism 20 may be of a double pinion type. Further, the first differential mechanism and the second differential mechanism may be also other differential mechanisms instead of the planetary gear mechanisms 10 and 20.

The connection of the rotation components of the first planetary gear mechanism 10 with respect to the engine 1, the brake BK1, the clutch CL1, and the second planetary gear mechanism 20 is not limited to the example. For example, the clutch CL1 may be used to connect other rotation components instead of the connection of the first sun gear 11 and the first carrier 14. Further, the engine 1, the brake BK1, and the second planetary gear mechanism 20 may be connected to the first planetary gear mechanism 10 so that the first planetary gear mechanism 10 decelerates the rotation of the engine 1 and outputs the rotation to the second planetary gear mechanism 20.

The connection of the rotation components of the second planetary gear mechanism 20 with respect to the first planetary gear mechanism 10, the first rotation machine MG1, and the driving wheel 32 is not limited to the example, and various combinations may be used.

The switching device that shifts the first planetary gear mechanism 10 is not limited to the exemplary combination of the clutch CL1 and the brake BK1.

The contents disclosed in the embodiments and the modified examples may be appropriately combined with one another.

REFERENCE SIGNS LIST 1-1 HYBRID VEHICLE DRIVING DEVICE
1 ENGINE
10 FIRST PLANETARY GEAR MECHANISM
20 SECOND PLANETARY GEAR MECHANISM
21 SECOND SUN GEAR
22 SECOND PINION GEAR
23 SECOND RING GEAR
24 SECOND CARRIER
32 DRIVING WHEEL
50 HV_ECU
100 VEHICLE
BK1 BRAKE
CL1 CLUTCH
MG1 FIRST ROTATION MACHINE
MG2 SECOND ROTATION MACHINE
ΔNg UNDERSHOOT AMOUNT
dNg ROTATION SPEED CHANGE RAT

The invention claimed is:

1. A hybrid vehicle driving device comprising:
   a first differential mechanism configured to be connected to an engine and transmit a rotation of the engine;
   a second differential mechanism configured to connect the first differential mechanism and a driving wheel; and
   a switching device configured to shift the first differential mechanism, wherein
   the second differential mechanism includes a first rotation component connected to an output component of the first differential mechanism, a second rotation component connected to a first rotation machine, and a third rotation component connected to a second rotation machine and the driving wheel, and
   a reaction torque of the first rotation machine is corrected at a torque phase after a start of the gear shift operation of the first differential mechanism by the switching device while the vehicle travels by using the engine as a power source.

2. The hybrid vehicle driving device according to claim 1, wherein
   at the time the first differential mechanism is shifted by the switching device, an output torque of the engine is constant or a change rate of the output torque is smaller than a predetermined value.

3. The hybrid vehicle driving device according to claim 1, wherein
   the reaction torque is corrected so as to suppress undershoot of the rotation speed of the first rotation machine at the torque phase.

4. The hybrid vehicle driving device according to claim 1, wherein
   the gear shift operation is an up-shift operation, and the reaction torque is decreased by the correction of the reaction torque.

5. The hybrid vehicle driving device according to claim 1, wherein
   the gear shift operation is a down-shift operation, and the reaction torque is increased by the correction of the reaction torque.

6. The hybrid vehicle driving device according to claim 1, wherein
   the switching device includes a clutch device,
   the reaction torque of the first rotation machine is corrected at the torque phase based on an estimated torque of an engaging clutch of the clutch device, the estimated torque of the engaging clutch being an estimated torque of an engaging torque when the clutch device is engaged at the time the first differential mechanism is shifted.

* * * * *